US012051966B2

(12) United States Patent
Chen et al.

(10) Patent No.: US 12,051,966 B2
(45) Date of Patent: Jul. 30, 2024

(54) CONVERTER AND ON-BOARD CHARGER

(71) Applicant: Huawei Digital Power Technologies Co., Ltd., Shenzhen (CN)

(72) Inventors: Chen Chen, Dongguan (CN); Bin Ma, Dongguan (CN); Weiping Liu, Dongguan (CN); Zhaoxue Cui, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 86 days.

(21) Appl. No.: 17/710,676

(22) Filed: Mar. 31, 2022

(65) Prior Publication Data
US 2022/0224225 A1 Jul. 14, 2022

(30) Foreign Application Priority Data

Mar. 31, 2021 (CN) .......................... 202110352122.7

(51) Int. Cl.
*H02M 1/32* (2007.01)
*B60L 53/22* (2019.01)
(Continued)

(52) U.S. Cl.
CPC .............. *H02M 1/32* (2013.01); *B60L 53/22* (2019.02); *H02H 9/047* (2013.01); *H02M 7/125* (2013.01); *H02M 7/797* (2013.01)

(58) Field of Classification Search
CPC ........ H02H 7/125; H02H 7/1252; H02H 9/04; H02H 9/045; H02H 9/047; H02M 1/32;
(Continued)

(56) References Cited

U.S. PATENT DOCUMENTS 10,811,954 B2 * 10/2020 Chu .................... H02M 1/0085
2006/0007621 A1 1/2006 Harford
(Continued)

FOREIGN PATENT DOCUMENTS

CN 101834539 A 9/2010
CN 102097968 A 6/2011
(Continued)

OTHER PUBLICATIONS

Font et al., "A New High Power Factor Bidirectional Hybrid Three-Phase Rectifier," Twenty-First Annual IEEE Applied Power Electronics Conference and Exposition, 2006, APEC '06, pp. 1300-1306, Institute of Electrical and Electronics Engineers, New York, New York (Mar. 19-23, 2006).

*Primary Examiner* — Fred E Finch, III
(74) *Attorney, Agent, or Firm* — Leydig, Voit & Mayer, Ltd.

(57) ABSTRACT

A converter for avoiding a short-circuit fault of the converter while inhibiting a surge impact includes: a power factor correction (PFC) circuit, a surge protection circuit, and a switch circuit. The PFC circuit is configured to: convert a first component of a first alternating current received by an alternating current terminal of the PFC circuit into a first direct current, and output the first direct current through a direct current terminal of the PFC circuit; and convert a second direct current received by the direct current terminal of the PFC circuit into a second alternating current, and output the second alternating current through the alternating current terminal of the PFC circuit.

15 Claims, 15 Drawing Sheets

(51) Int. Cl.
*H02M 7/12* (2006.01)
*H02M 7/797* (2006.01)
*H02H 9/04* (2006.01)

(58) Field of Classification Search
CPC .. H02M 1/4216; H02M 1/4233; H02M 7/125; H02M 7/23; H02M 7/797; B60L 53/22
See application file for complete search history.

(56) References Cited

U.S. PATENT DOCUMENTS

| | | | |
|---|---|---|---|
| 2011/0122667 A1* | 5/2011 | Mino | H02M 1/4208 363/125 |
| 2013/0057200 A1 | 3/2013 | Potts et al. | |
| 2016/0301298 A1* | 10/2016 | Gonthier | H02M 7/515 |
| 2018/0048246 A1 | 2/2018 | Andrieux et al. | |
| 2018/0097441 A1* | 4/2018 | Chang | H02H 9/04 |
| 2022/0219553 A1* | 7/2022 | Fu | H02M 3/33573 |
| 2022/0224250 A1* | 7/2022 | Koerner | H02M 1/15 |
| 2022/0278607 A1* | 9/2022 | Everts | H02M 1/4216 |
| 2023/0223840 A1* | 7/2023 | Zhu | H02M 1/4208 363/84 |

FOREIGN PATENT DOCUMENTS

| | | |
|---|---|---|
| CN | 203086328 U | 7/2013 |
| CN | 205725513 U | 11/2016 |
| CN | 207082840 U | 3/2018 |
| CN | 108155820 A | 6/2018 |
| EP | 3301798 A1 | 4/2018 |
| JP | H11252923 A | 9/1999 |
| JP | 2014161195 A | 9/2014 |

\* cited by examiner

CONVERTER AND ON-BOARD CHARGER

CROSS-REFERENCE TO RELATED APPLICATIONS

This application claims priority to Chinese Patent Application No. 202110352122.7, filed on Mar. 31, 2021, which is hereby incorporated by reference in its entirety.

TECHNICAL FIELD

This application relates to the field of power electronics technologies, and in particular, to a converter and an on-board charger.

BACKGROUND

With development of technologies in the field of new energy, application of new energy vehicles, for example, electric vehicles, is increasingly popular. Because infrastructure for fast direct current charging is incomplete at present, on-board chargers (OBC) are usually configured for new energy vehicles for charging convenience, so that users can charge power batteries through household alternating current power sockets.

Because users have increasingly high requirements on a driving mileage of new energy vehicles, capacities of power batteries accordingly become larger, and a higher charging power class of the power batteries is also required. Therefore, an OBC generally has relatively high charging power, to implement fast charging. In addition, the OBC may be further compatible with an inverter function, to implement a vehicle-to-vehicle (V2V) discharging function and a vehicle-to-load (V2L) discharging function. For example, during electricity consumption off-peak hours of a grid, power supply of an on-board storage battery may be implemented by using a charging function, and during electricity consumption peak hours of the grid, electric energy stored in the on-board storage battery may be fed back to the grid by using a discharging function, thereby improving utilization of electric energy of the grid.

A surge impact is one of the main causes of a failure of an electronic device in the OBC. In surge impacts caused by many factors, surge impacts caused by lightning and a system switching operation have a great impact on operation and life of the electronic device. In this case, a protection device, for example, a surge protection device (SPD) needs to be configured in the OBC, to mutually cooperate with a conventional lightning protection network or an air-terminal system to further protect the OBC. A main function of the SPD is to inhabit an overvoltage and an overcurrent that are on a circuit and that are caused by a surge impact, and limit a voltage and a current of the circuit to a low level, thereby ensuring normal operation of the electronic device on the circuit and implementing protection.

Currently, an SPD including diodes is mainly used in an OBC. When surge impact energy is input to the OBC, this part of energy directly flows to a direct current bus through the diodes and is consumed. However, for an OBC for bidirectional charging, when an inverter function of the OBC is enabled, if an alternating current terminal of the OBC is connected to a capacitive load, and when a discharging cycle of the capacitive load is less than a cycle of an alternating current, energy of the capacitive load constitutes a short-circuit path through the OBC. Consequently, electronic devices inside the OBC are at risk.

SUMMARY

This application provides a converter and an on-board charger, to avoid a short-circuit fault of the converter while inhibiting a surge impact.

According to a first aspect, an embodiment of this application provides a converter. The converter may include a power factor correction circuit (PFC circuit), a surge protection circuit, and a switch circuit.

The PFC circuit is configured to: convert a first component of a first alternating current received by an alternating current terminal of the PFC circuit into a first direct current, and output the first direct current through a direct current terminal of the PFC circuit, where an absolute value of an instantaneous voltage value of the first component is less than or equal to a preset threshold; and convert a second direct current received by the direct current terminal of the PFC circuit into a second alternating current, and output the second alternating current through the alternating current terminal of the PFC circuit. An alternating current terminal of the surge protection circuit is connected to the alternating current terminal of the PFC circuit, a direct current terminal of the surge protection circuit is connected to a first terminal of the switch circuit, and the surge protection circuit is configured to: convert a second component of the first alternating current into a third direct current, and output the third direct current through the direct current terminal of the surge protection circuit, where an absolute value of an instantaneous voltage value of the second component is greater than the preset threshold. A second terminal of the switch circuit is connected to the direct current terminal of the PFC circuit, and the switch circuit is configured to be turned on when the direct current terminal of the PFC circuit outputs the first direct current, and to be turned off when the alternating current terminal of the PFC circuit outputs the second alternating current.

A voltage value of the first direct current may be equal to a voltage value of the third direct current. Specifically, both the direct current terminal of the PFC circuit and the alternating current terminal of the surge protection circuit may be connected to a charged device (for example, an on-board storage battery), the direct current terminal of the PFC circuit outputs the first direct current, and the direct current terminal of the surge protection circuit outputs the third direct current, to supply power to the charged device. A rated voltage of a power consumption device may be the voltage value of the first direct current.

Further, a positive direction and a negative direction of the first direct current may be the same as those of the third direct current. That a positive direction and a negative direction of the first direct current are the same as those of the third direct current may specifically mean that if both the direct current terminal of the PFC circuit and the direct current terminal of the surge protection circuit are connected in parallel to the charged device, in the direct current terminal of the PFC circuit, one terminal that outputs a high electrical level is connected to a positive electrode of the charged device, one terminal that outputs a low electrical level is connected to a negative electrode of the charged device, and a difference between voltages of the high electrical level and the low electrical level is equal to the voltage value of the first direct current; and similarly, in the direct current terminal of the surge protection circuit, one terminal that outputs a high electrical level is connected to the positive electrode of the charged device, one terminal that outputs a low electrical level is connected to the negative electrode of the charged device, and a difference between voltages of the high electrical level and the low electrical level is equal to the voltage value of the third direct current.

In the converter provided in the first aspect, when the converter is configured to charge the charged device (for example, the on-board storage battery), if there is no surge impact exists in a circuit, the PFC circuit converts the first alternating current received by the alternating current terminal of the PFC circuit into the first direct current; or if there is a surge impact exists in the circuit, the PFC circuit converts a part, with an instantaneous voltage value less than or equal to the preset threshold, in the first alternating current into the first direct current that is available to a back-end device, and the surge protection circuit converts a part (surge impact energy), with an instantaneous voltage value less than or equal to the preset threshold, in the first alternating current into the third direct current that is available to the back-end device for consumption by the back-end device. This effectively avoids an impact of the surge impact energy on the PFC circuit. In addition, because the switch circuit is connected to a rear terminal of the surge protection circuit, when an inverter function of the converter is enabled, the switch circuit is turned off, and a closed path cannot be formed between a capacitive load connected to the alternating current terminal of the PFC circuit and the surge protection circuit, thereby effectively avoiding a short-circuit failure of the converter.

In an exemplary implementation, the converter provided in this embodiment of this application may further include a controller.

The controller is configured to: control the PFC circuit to convert the first component into the first direct current, and convert the second direct current into the second alternating current.

According to the solution, under control of the controller, power may be supplied to the charged device through the converter.

In an exemplary implementation, the controller is further configured to control states of the switch circuit. The states include turn-off and turn-on.

According to the solution, under control of the controller, the third direct current output by the surge protection circuit may be supplied to the charged device through the switch circuit.

To enable the converter to convert different types of alternating currents, in this embodiment of this application, the PFC circuit, the switch circuit, and the surge protection circuit may have different structures. Exemplary implementations of the PFC circuit, the switch circuit, and the surge protection circuit include the following.

In an exemplary implementation, the alternating current terminal of the PFC circuit is a three-phase alternating current terminal, and the PFC circuit includes a first bidirectional converter, a second bidirectional converter, and a third bidirectional converter.

An alternating current terminal of the first bidirectional converter is a first alternating current terminal of the three-phase alternating current terminal, an alternating current terminal of the second bidirectional converter is a second alternating current terminal of the three-phase alternating current terminal, and an alternating current terminal of the third bidirectional converter is a third alternating current terminal of the three-phase alternating current terminal. The first alternating current terminal, the second alternating current terminal, and the third alternating current terminal constitute the three-phase alternating current terminal. A direct current terminal of the first bidirectional converter, a direct current terminal of the second bidirectional converter, and a direct current terminal of the third bidirectional converter constitute the direct current terminal of the PFC circuit, and the direct current terminal of the PFC circuit is connected to a first direct current bus.

According to the solution, when the converter converts a three-phase alternating current, the first bidirectional converter, the second bidirectional converter, and the third bidirectional converter each constitute a single-phase converter, to convert one phase of alternating current in the three-phase alternating current received by the alternating current terminal, so as to implement three-phase rectification.

In an exemplary design, the first bidirectional converter includes: a first inductor, where a first terminal of the first inductor is connected to the first alternating current terminal; a first bidirectional switch, where the first bidirectional switch is connected between a second terminal of the first inductor and a positive terminal of the first direct current bus; and a second bidirectional switch, where the second bidirectional switch is connected between the second terminal of the first inductor and a negative terminal of the first direct current bus. The second bidirectional converter includes: a second inductor, where a first terminal of the second inductor is connected to the second alternating current terminal; a third bidirectional switch, where the third bidirectional switch is connected between a second terminal of the second inductor and the positive terminal of the first direct current bus; and a fourth bidirectional switch, where the fourth bidirectional switch is connected between the second terminal of the second inductor and the negative terminal of the first direct current bus. The third bidirectional converter includes: a third inductor, where a first terminal of the third inductor is connected to the third alternating current terminal; a fifth bidirectional switch, where the fifth bidirectional switch is connected between a second terminal of the third inductor and the positive terminal of the first direct current bus; and a sixth bidirectional switch, where the sixth bidirectional switch is connected between the second terminal of the third inductor and the negative terminal of the first direct current bus.

In an exemplary design, the PFC circuit further includes a seventh bidirectional switch and an eighth bidirectional switch.

The seventh bidirectional switch is connected between the positive terminal of the first direct current bus and a first neutral line. The eighth bidirectional switch is connected between the negative terminal of the first direct current bus and the first neutral line.

In an exemplary implementation, the switch circuit includes a first unidirectional switch and a second unidirectional switch.

A first electrode of the first unidirectional switch is connected to the direct current terminal of the surge protection circuit, and a second electrode of the first unidirectional switch is connected to the positive terminal of the first direct current bus. A first electrode of the second unidirectional switch is connected to the negative terminal of the first direct current bus, and a second electrode of the second unidirectional switch is connected to the direct current terminal of the surge protection circuit.

In an exemplary implementation, the surge protection circuit includes a first unidirectional converter, a second unidirectional converter, and a third unidirectional converter.

An alternating current terminal of the first unidirectional converter is connected to the first alternating current terminal, an alternating current terminal of the second unidirectional converter is connected to the second alternating current terminal, and an alternating current terminal of the third unidirectional converter is connected to the third alternating current terminal.

The alternating current terminal of the first unidirectional converter, the alternating current terminal of the second unidirectional converter, and the alternating current terminal of the third unidirectional converter constitute the alternating current terminal of the surge protection circuit. A direct current terminal of the first unidirectional converter, a direct current terminal of the second unidirectional converter, and a direct current terminal of the third unidirectional converter constitute the direct current terminal of the surge protection circuit.

According to the solution, a surge voltage exists in an alternating current received by the converter, and the surge voltage in the received alternating current may be converted, by using the surge protection circuit, into a direct current that is available to the charged device. Specifically, the first unidirectional converter, the second unidirectional converter, and the third unidirectional converter each convert one phase of alternating current in the three-phase alternating current, to implement three-phase rectification.

In an exemplary implementation, the first unidirectional converter includes: a first diode, where the first diode is connected between the first alternating current terminal and the first electrode of the first unidirectional switch; and a second diode, where the second diode is connected between the first alternating current terminal and the second electrode of the second unidirectional switch. The second unidirectional converter includes: a third diode, where the third diode is connected between the second alternating current terminal and the first electrode of the first unidirectional switch; and a fourth diode, where the fourth diode is connected between the second alternating current terminal and the second electrode of the second unidirectional switch. The third unidirectional converter includes: a fifth diode, where the fifth diode is connected between the third alternating current terminal and the first electrode of the first unidirectional switch; and a sixth diode, where the sixth diode is connected between the third alternating current terminal and the second electrode of the second unidirectional switch.

In an exemplary implementation, the alternating current terminal of the PFC circuit is a single-phase alternating current terminal, and the PFC circuit includes a fourth bidirectional converter and a fifth bidirectional converter.

An alternating current terminal of the fourth bidirectional converter is a fourth alternating current terminal of the single-phase alternating current terminal, and an alternating current terminal of the fifth bidirectional converter is a fifth alternating current terminal of the single-phase alternating current terminal. The fourth alternating current terminal and the fifth alternating current terminal constitute the single-phase alternating current terminal. A direct current terminal of the fourth bidirectional converter and a direct current terminal of the fifth bidirectional converter constitute the direct current terminal of the PFC circuit, and the direct current terminal of the PFC circuit is connected to a second direct current bus.

According to the solution, the fourth bidirectional converter may be used to convert a positive half-cycle voltage of a received single-phase alternating current, and the fifth bidirectional converter may be used to convert a negative half-cycle voltage of the single-phase alternating current, so as to implement single-phase rectification.

In an exemplary implementation, the fourth bidirectional converter includes: a fourth inductor, where a first terminal of the fourth inductor is connected to the fourth alternating current terminal; a ninth bidirectional switch, where the ninth bidirectional switch is connected between a second terminal of the fourth inductor and a positive terminal of the second direct current bus; and a tenth bidirectional switch, where the tenth bidirectional switch is connected between the second terminal of the fourth inductor and a negative terminal of the second direct current bus. The fifth bidirectional converter includes: a fifth inductor, where a first terminal of the fifth inductor is connected to the fifth alternating current terminal; an eleventh bidirectional switch, where the eleventh bidirectional switch is connected between a second terminal of the fifth inductor and the positive terminal of the second direct current bus; and a twelfth bidirectional switch, where the twelfth bidirectional switch is connected between the second terminal of the fifth inductor and the negative terminal of the second direct current bus.

In an exemplary implementation, the fourth alternating current terminal is connected to the fifth alternating current terminal, and the PFC circuit further includes a thirteenth bidirectional switch and a fourteenth bidirectional switch.

The thirteenth bidirectional switch is connected between the positive terminal of the second direct current bus and a second neutral line. The fourteenth bidirectional switch is connected between the negative terminal of the second direct current bus and the second neutral line.

In an exemplary implementation, the switch circuit includes a third unidirectional switch and a fourth unidirectional switch.

A first electrode of the third unidirectional switch is connected to the direct current terminal of the surge protection circuit, and a second electrode of the third unidirectional switch is connected to the positive terminal of the second direct current bus. A first electrode of the fourth unidirectional switch is connected to the negative terminal of the second direct current bus, and a second electrode of the fourth unidirectional switch is connected to the direct current terminal of the surge protection circuit.

In an exemplary implementation, the surge protection circuit includes an H-bridge rectifier circuit including diodes.

An intermediate node of a first bridge arm of the H-bridge rectifier circuit is connected to the fourth alternating current terminal, an intermediate node of a second bridge arm of the H-bridge rectifier circuit is connected to the fifth alternating current terminal, both a first terminal of the first bridge arm and a first terminal of the second bridge arm are connected to the first electrode of the third unidirectional switch, and both a second terminal of the first bridge arm and a second terminal of the second bridge arm are connected to the second electrode of the fourth unidirectional switch.

According to a second aspect, an embodiment of this application provides an on-board charger. The on-board charger may include a direct current-to-direct current converter circuit (DC/DC converter circuit) and the converter provided in the first aspect and any exemplary design of the first aspect in the embodiments of this application.

The converter is configured to: receive a first alternating current, convert the first alternating current into a first direct current, and output the first direct current to the DC/DC converter circuit; and convert a second direct current output by the DC/DC converter circuit into a second alternating current, and output the second alternating current. The DC/DC converter circuit is connected to the converter, and the DC/DC converter circuit is configured to: convert the first direct current output by the converter into a third direct current, and output the third direct current to a charged device; and convert a fourth direct current output by the charged device into a second direct current, and transmit the second direct current to the converter.

Specifically, the charged device may be a power battery. For example, the charged device may be a power battery such as a nickel metal hydride battery, a lithium battery, or a lead-acid battery.

In addition, for technical effects brought by any exemplary design manner in the second aspect, refer to technical effects brought by different design manners in the first aspect. Details are not described herein again.

DESCRIPTION OF EMBODIMENTS

Figure 1:
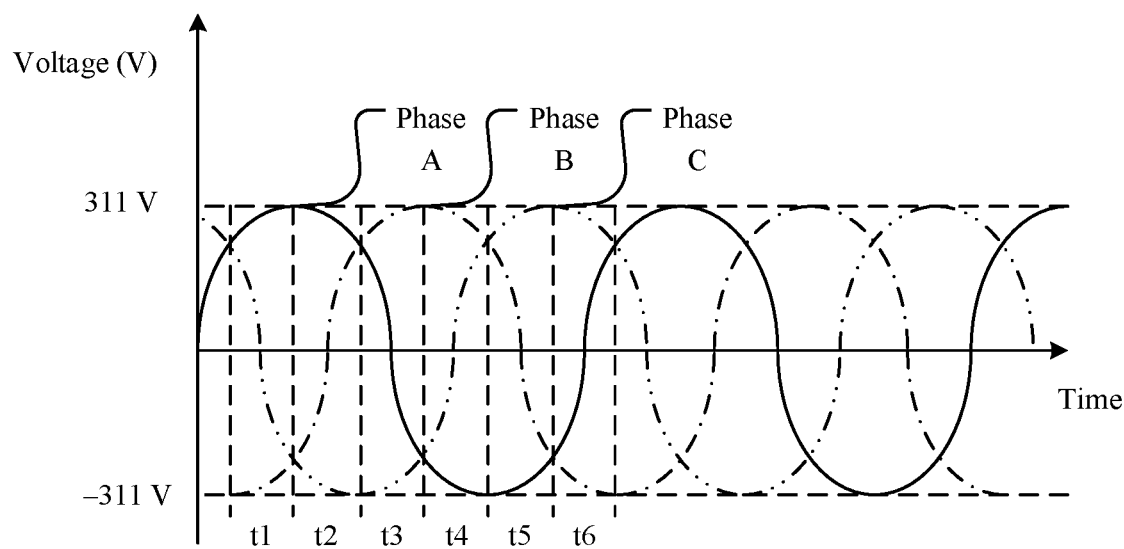
FIG. 1 is a schematic diagram of a waveform of a three-phase alternating current according to an embodiment of this application.

To make objectives, technical solutions, and advantages of this application clearer, the following further describes this application in detail with reference to accompanying drawings.

A specific operation method in a method embodiment may also be applied to an apparatus embodiment or a system embodiment. It should be noted that in description of this application, "at least one" means one or more, and "a plurality of" means two or more. In view of this, in embodiments of this application, "a plurality of" may also be understood as "at least two". The term "and/or" describes an association relationship between associated objects and indicates that three relationships may exist. For example, A and/or B may indicate the following three cases: Only A exists, both A and B exist, and only B exists. In addition, the character "/" generally indicates an "or" relationship between the associated objects, unless otherwise specified. In addition, it should be understood that in the description of this application, terms such as "first" and "second" are merely used for distinguishing and description, but should not be understood as indicating or implying relative importance, or should not be understood as indicating or implying a sequence.

It should be noted that the "connection" in embodiments of this application refers to an electric connection, and the connection between two electrical elements may be a direct or indirect connection between the two electrical elements. For example, a connection between A and B may represent that A and B are directly connected to each other, or A and B are indirectly connected to each other by using one or more other electrical elements. For example, the connection between A and B may also represent that A is directly connected to C, C is directly connected to B, and A and B are connected to each other through C.

It should be noted that bidirectional switches in the embodiments of this application may be one or more types of a plurality of types of power devices such as a relay, a metal-oxide-semiconductor field-effect transistor (MOSFET), a bipolar junction transistor (BJT), an insulated gate bipolar transistor (IGBT), and a silicon carbide (SiC) transistor. Details are not described in the embodiments of this application again. Each power device may include a first electrode, a second electrode, and a control electrode, where the control electrode is configured to control turn-on or turn-off of the power device. When the power device is turned on, a current may be transmitted between the first electrode and the second electrode of the power device. When the power device is turned off, the current cannot be transmitted between the first electrode and the second electrode of the power device. A MOSFET is used as an example. The control electrode of the power device is a gate; and the first electrode of the power device may be a source of the power device, and the second electrode may be a drain of the power device; or the first electrode may be a drain of the power device, and the second electrode may be a source of the power device.

For ease of description, an alternating current converter is described below in the embodiments of this application. It should be noted that the alternating current converter is a converter that can support both alternating current (AC)-to-direct current (DC) conversion (AC/DC) and DC/AC conversion.

Currently, common alternating currents mainly include a single-phase alternating current and a three-phase alternating current. The three-phase alternating current is used as an example. FIG. 1 is a diagram of an example of a voltage waveform of a three-phase alternating current. As shown in FIG. 1, the three-phase alternating current mainly includes three single-phase alternating currents among which phase offsets exist, namely, a phase A alternating current, a phase B alternating current, and a phase C alternating current shown in FIG. 1. Each single-phase alternating current fluctuates periodically as a sine wave with a same fluctuation amplitude (mostly ±311 V in China) and a same fluctuation frequency (mostly 50 Hz in China). In the three-phase alternating current, a phase difference between each phase of alternating current and the other two phases of alternating current is 120°. For example, at a moment, a phase of the phase A alternating current is 0, a phase of the phase B alternating current is 120°, and a phase of the phase C alternating current is 240° (namely, −120°).

Figure 2:
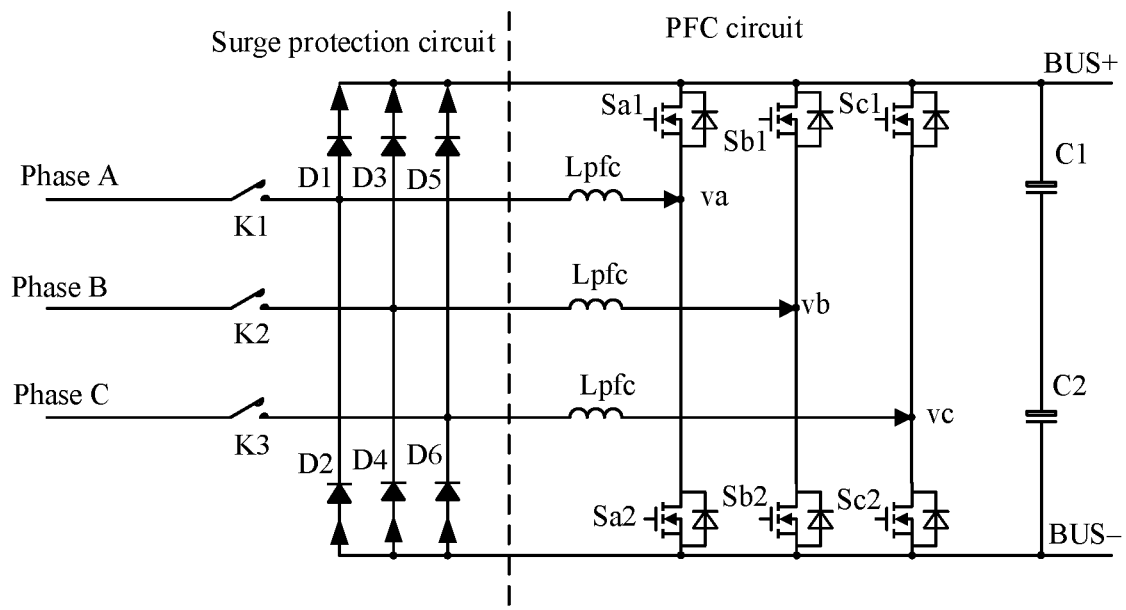
FIG. 2 is a schematic diagram of a structure of an alternating current converter according to an embodiment of this application.

Both the single-phase alternating current and the three-phase alternating current are commonly used alternating currents in the market. Therefore, the converter that supports both the AC-DC conversion and the DC-AC conversion has a broad application prospect. For example, the converter is used in an on-board charger (OBC) for charging a new energy vehicle. The OBC may convert a voltage of a grid into a charging voltage for a power battery in the new energy vehicle, to charge the power battery, and may feed back electric energy stored in the power battery to the grid or supply the electric energy to an on-board power consumption device. FIG. 2 is a schematic diagram of an example of a structure of an alternating current converter that supports both AC-DC conversion and DC-AC conversion.

As shown in FIG. 2, an alternating current power supply is connected to the alternating current converter through a switch. When the switch is turned on, a phase A alternating current, a phase B alternating current, and a phase C alternating current in a three-phase alternating current output by the alternating current power supply each are transmitted to the converter through a corresponding circuit. When a switch circuit is switched from a turn-off state to a turn-on state, a surge voltage may be generated on the circuits, and the surge voltage is output to the converter after being superimposed with the three-phase alternating current. Specifically, the alternating current converter mainly includes two parts. A part on a left side of a dotted line is a surge protection circuit including diodes, and a part on a right side of the dotted line is a power factor correction (power factor correction, PFC) circuit including a switch and an inductor. A surge voltage in an alternating current that can be received by the surge protection circuit is converted into a direct current voltage, and then the direct current voltage is output to a back-end direct current bus including capacitors C1 and C2. The PFC circuit may convert the three-phase alternating current voltage output by the alternating current power supply into a direct current voltage, and output the direct current voltage to the direct current bus. In this case, the alternating current converter is in a rectification state. It should be noted that a rear terminal of the direct current bus may be connected to a charged device (for example, a power battery of a new energy vehicle), to charge the charged device.

When the converter is in an inverter state, a left side of the PFC circuit may be connected to a power consumption device. In this case, the PFC circuit may receive a direct current output by the direct current bus, and convert the received direct current into an alternating current, to supply power to the power consumption device.

Figure 3:
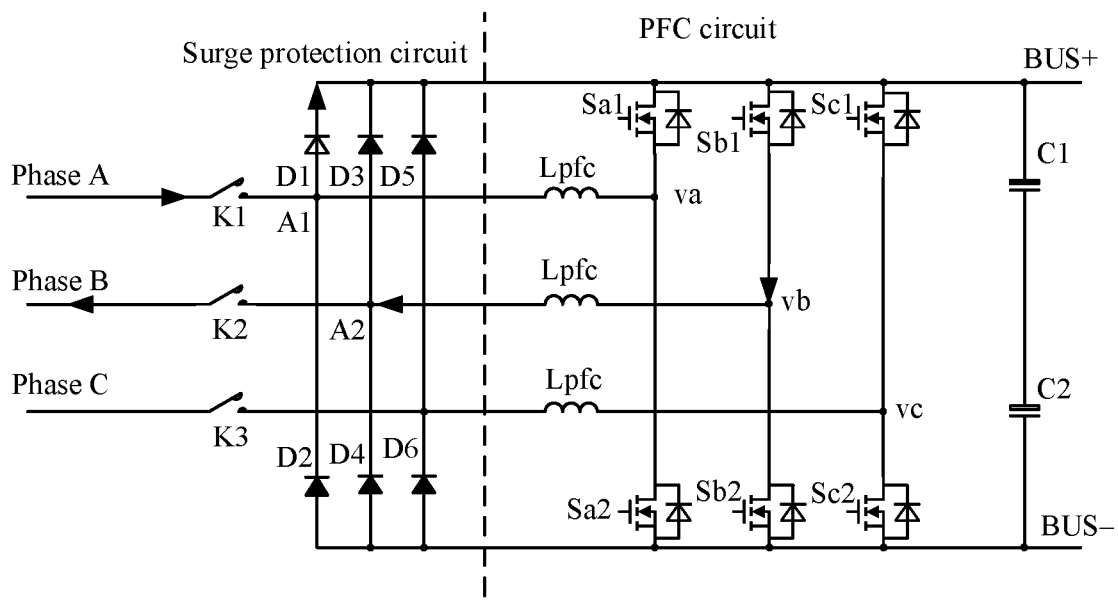
FIG. 3 is a schematic diagram of a flow direction of a current of an alternating current converter according to an embodiment of this application.

In actual use, for example, the power consumption device is a capacitive load, and the capacitive load has a charging and discharging cycle. When the charging and discharging cycle of the capacitive load is different from a phase offset cycle of the alternating current output by the PFC circuit, a voltage value of the capacitive load may be greater than a voltage output by the PFC circuit. For example, the alternating current converter outputs a single-phase alternating current through ports A1 and A2, and supply power to the capacitive load through switches K1 and K2. In a positive half cycle of the single-phase alternating current, K1 is one terminal that is of the capacitive load and that receives a high electrical level, and K2 is one terminal that is of the capacitive load and that receives a low electrical level in this case. When the positive half cycle of the output single-phase alternating current reaches a peak, effective values output by the ports A1 and A2 are gradually decreased. If a discharging speed of the capacitive load is less than the cycle of the single-phase alternating current, an electrical level of K1 is higher than an electrical level of the port A1. In this case, the capacitive load is equivalent to a power supply, and K1 is a positive electrode of the power supply. Refer to FIG. 3. A current may return to a negative electrode of the power supply through a diode D1 and a switch Sa1. In this case, the capacitive load and the alternating current converter are short-circuited, causing damage to the alternating current converter and the power consumption device.

In view of this, this application provides a converter. In addition to supporting both AC-DC conversion and DC-AC conversion, surge protection can be implemented, a short-circuit failure of a circuit can be effectively avoided, and normal operation of the converter is ensured.

Figure 4:
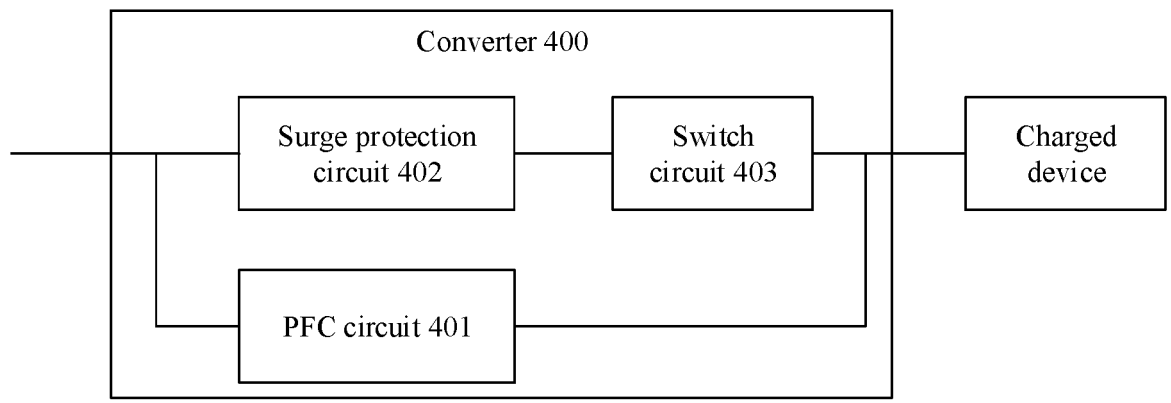
FIG. 4 is a schematic diagram of a structure of a converter according to an embodiment of this application.

FIG. 4 is a schematic diagram of a structure of a converter according to an embodiment of this application. As shown in FIG. 4, the converter 400 mainly includes a PFC circuit 401, a surge protection circuit 402, and a switch circuit 403.

Specifically, an alternating current terminal of the surge protection circuit 402 is connected to an alternating current terminal of the PFC circuit 401, a direct current terminal of the surge protection circuit 402 is connected to a first terminal of the switch circuit 403, and a second terminal of the switch circuit 403 is connected to a direct current terminal of the PFC circuit 401.

The PFC circuit 401 may be configured to: convert a first component of a first alternating current received by the alternating current terminal of the PFC circuit 401 into a first direct current, and output the first direct current through the direct current terminal of the PFC circuit 401, where an absolute value of an instantaneous voltage value of the first component is less than or equal to a preset threshold; and convert a second direct current received by the direct current terminal of the PFC circuit 401 into a second alternating current, and output the second alternating current through the alternating current terminal of the PFC circuit 401. The surge protection circuit 402 may be configured to: convert a second component of the first alternating current into a third direct current, and output the third direct current through the direct current terminal of the surge protection circuit 402, where an absolute value of an instantaneous voltage value of the second component is greater than the preset threshold. The switch circuit 403 may be configured to be turned on when the direct current terminal of the PFC circuit 401 outputs the first direct current, and to be turned off when the alternating current terminal of the PFC circuit 401 outputs the second alternating current.

A voltage value of the first direct current is equal to a voltage value of the third direct current. In this case, the direct current terminal (which outputs the first direct current) of the PFC circuit 401 may be electrically connected to a charged device. The direct current terminal (which outputs the third direct current) of the surge protection circuit 402 may also be electrically connected to the charged device through the switch circuit 403. To be specific, both the PFC circuit 401 and the surge protection circuit 402 have a voltage conversion function, and respectively rectify the received first component and the received second component. Outputs of the PFC circuit 401 and the surge protection circuit 402 are connected in parallel and are connected to the charged device, to charge the charged device.

Further, a positive direction and a negative direction of the first direct current may be the same as those of the third direct current. That a positive direction and a negative direction of the first direct current are the same as those of the third direct current may specifically mean that if the direct current terminal of the PFC circuit 401 is connected to the charged device, one terminal that is in the direct current terminal of the PFC circuit 401 and that outputs a high electrical level is connected to one terminal that is of the charged device and that receives the high electrical level, and one terminal that is in the direct current terminal of the PFC circuit 401 and that outputs a low electrical level is connected to one terminal that is of the charged device and that receives the low electrical level; and similarly, if the direct current terminal of the surge protection circuit 402 is connected to the first terminal of the switch circuit 403, and the second terminal of the switch circuit 403 is connected to the charged device, when the switch circuit 403 is turned on, one terminal that is in the direct current terminal of the surge protection circuit 402 and that outputs a high electrical level is connected to one terminal that is of the charged device and that receives the high electrical level, and one terminal that is in the direct current terminal of the surge protection circuit 402 and that outputs a low electrical level is connected to one terminal that is of the charged device and that receives the low electrical level.

When the converter 400 is configured to charge the charged device, if a surge voltage exists in the first alternating current received by the alternating current terminal of the PFC circuit 401, the PFC circuit 401 may convert the first component of the first alternating current into the first direct current, and output the first direct current through the direct current terminal of the PFC circuit 401, and the surge protection circuit 402 converts the second component of the first alternating current received by the alternating current terminal into the third direct current; or if there is no surge voltage exist in the first alternating current received by the alternating current terminal of the PFC circuit 401, the PFC circuit 401 may directly convert the first alternating current received by the alternating current terminal into the first direct current. The absolute value of the instantaneous voltage value of the first component is less than or equal to the preset threshold, and the absolute value of the instantaneous voltage value of the second component is greater than the preset threshold. The preset threshold may be a peak value of an alternating current output by an alternating current power supply connected to the converter 400. When the first alternating current includes a surge voltage, the first component and the second component of the first alternating current constitute the first alternating current.

Figure 5:
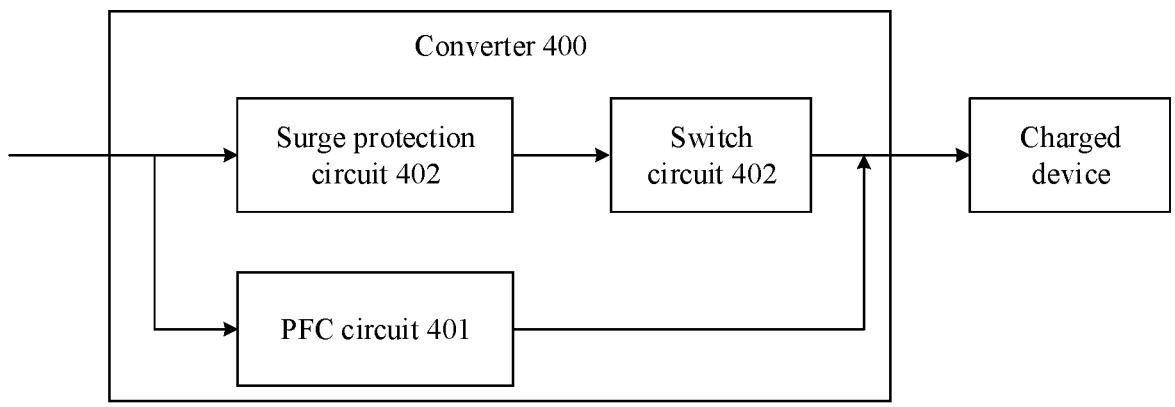
FIG. 5 is a schematic diagram of a structure of a converter according to an embodiment of this application.

Specifically, when the charged device is charged, an equivalent circuit of the converter 400 may be shown in FIG. 5. In this case, the alternating current terminal of the PFC circuit 401 and the alternating current terminal of the surge protection circuit 402 are used as an input terminal of the converter 400, and the direct current terminal of the PFC circuit 401 and the second terminal of the switch circuit 403 are used as an output terminal of the converter 400 after being connected in parallel. In specific implementation, the charged device may be an inverter, a power battery of a new energy vehicle, or another device powered by a direct current. The converter 400 shown in FIG. 5 may charge the charged device through the alternating current power supply.

It should be understood that a voltage fluctuation of a direct current obtained after the converter 400 rectifies the first alternating current is large, and a voltage value of an output direct current is difficult to meet a voltage requirement of the charged device. Therefore, a DC/DC converter circuit may be further connected between the converter 400 and the charged device. The DC/DC converter circuit may perform rectification and voltage adjustment processing on the direct current output by the converter 400, to output a direct current voltage that is available to the charged device.

When the converter 400 is configured to discharge the charged device, the switch circuit 403 is turned off. Therefore, the surge protection circuit 402 can perform only unidirectional AC-DC conversion. Therefore, the surge protection circuit 402 does not operate in this case. That is, when the charged device discharges, only a part of circuit in the converter 400 operates. Specifically, the PFC circuit 401 may be configured to convert the second direct current output by the charged device into the second alternating current that is available to a power consumption device.

Figure 6:
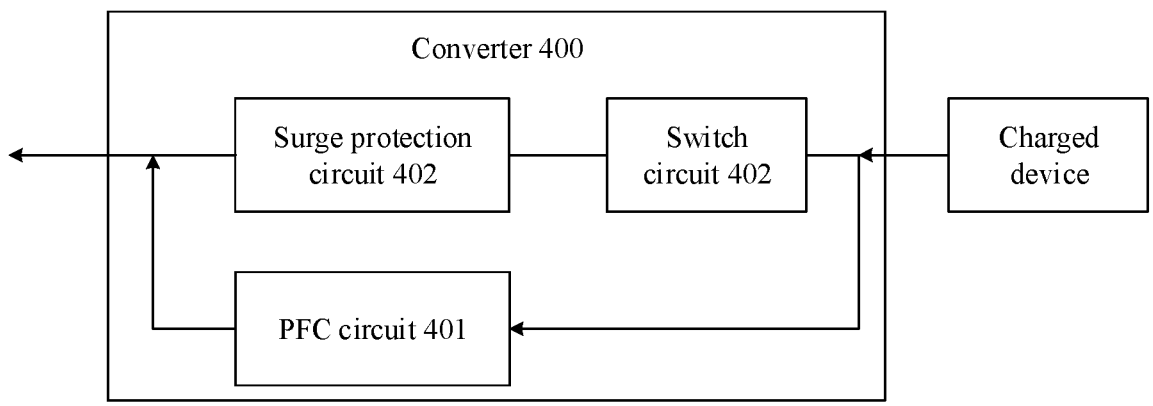
FIG. 6 is a schematic diagram of a structure of a converter according to an embodiment of this application.

Specifically, when the charged device discharges, an equivalent circuit of the converter 400 may be shown in FIG. 6. In this case, the direct current terminal of the PFC circuit 401 is used as an input terminal of the converter 400, and the alternating current terminal of the PFC circuit 401 is used as an output terminal of the converter.

It should be understood that when the charged device discharges, the switch circuit 403 in the converter 400 is turned off. If the power consumption device is a capacitive load, the surge protection circuit 401 and the switch circuit 403 cannot form a closed path. Therefore, a short-circuit fault between the power consumption device and the converter 400 can be effectively avoided, and normal operation of the converter 400 is ensured.

In a specific implementation, the electrical device may be an on-board power consumption device, or may be another power battery. The converter 400 shown in FIG. 6 may be used to supply power to an on-board power consumption device or charge another power battery through a power battery.

For example, the power consumption device may be an on-board power consumption device, for example, an induction cooker or a rice cooker, and the charged device may be a power battery. Therefore, when the power battery discharges, a direct current of 90 V to 400 V may be output. After DC/AC conversion is performed, by using the PFC circuit 401, on the direct current output by the power battery, an alternating current of 220 V is output for use by a device, for example, an induction cooker or a rice cooker.

For example, the power consumption device and the charged device may be respectively power batteries on two new energy vehicles, where an electricity quantity of the charged device is greater than an electricity quantity of the power consumption device. In this case, the charged device may charge the power consumption device through the converter 400. Specifically, when the charged device discharges, a direct current of 90 V to 400 V may be output. After DC/AC conversion is performed, by using the PFC circuit 401, on the direct current output by the charged device, an alternating current is output, to charge a power battery of the other new energy vehicle.

It should be understood that if the direct current output by the charged device is directly inverted by using the PFC circuit 401, a voltage value of an output alternating current may be difficult to meet a voltage requirement of the power consumption device. Therefore, a DC/DC converter may be included between the converter 400 and the charged device. The DC/DC converter may first adjust the voltage value of the direct current output by the charged device, and send the direct current to the PFC circuit 401 for inversion processing, to output an alternating current voltage that is available to the power consumption device.

For ease of description, in this embodiment of this application, a charging process of the converter 400 is referred to as "forward charging", and a discharging process of the converter 400 is referred to as "reverse discharging".

In actual application, the converter 400 may be fastened onto a new energy vehicle, and the power consumption device may be connected to the converter 400 through a fixed interface on the new energy vehicle. For example, a power plug of a device such as an induction cooker or a rice cooker may be directly plugged into the fixed interface, so that a power battery supplies power to the induction cooker or the rice cooker. In another implementation, the converter 400 may alternatively be disposed into a flexible detachable form. To be specific, a fixed interface is disposed on the new energy vehicle, to connect the converter 400 and the charged device. In this case, the converter 400 may be considered as an apparatus independent of the new energy vehicle.

In specific implementation, the PFC circuit 401, the surge protection circuit 402, and the switch circuit 403 each may include devices such as a switch, a diode, an inductor, and a capacitor. Operation states of the PFC circuit 401, the surge protection circuit 402, and the switch circuit 403 may be implemented by adjusting operation states of these devices (for example, the switch).

In this application, a controller may be used to adjust the foregoing operation states. To be specific, the converter 400 may further include a controller, and when the converter 400 is configured to perform "forward charging", the controller may be configured to control the PFC circuit 401 to convert the first component of the first alternating current into the first direct current, and control an operation state of the switch circuit 403; and when the converter 400 is configured to perform "reverse discharging", the controller may be configured to control the PFC circuit 401 to convert the second direct current received by the direct current terminal into the second alternating current.

It should be understood that when the converter 400 is configured to perform "forward charging", if a device in the surge protection circuit 402 is a switch, the controller may be further configured to control the surge protection circuit 402 to convert the second component of the first alternating current into the third direct current.

In specific implementation, the controller may be any one of a micro control unit (MCU), a central processing unit (CPU), or a digital signal processor (DSP). Certainly, a specific form of the controller is not limited to the foregoing examples.

The following describes specific structures of the PFC circuit 401, the surge protection circuit 402, and the switch circuit 403 in the converter 400.

1. PFC Circuit 401

The alternating current terminal of the PFC circuit 401 is connected to the alternating current terminal of the surge protection circuit 402, the direct current terminal of the PFC circuit 401 is connected to the second terminal of the switch circuit, and the PFC circuit 401 may be configured to: convert the first component of the first alternating current received by the alternating current terminal of the PFC circuit into the first direct current, and output the first direct current through the direct current terminal of the PFC circuit; and convert the second direct current received by the direct current terminal of the PFC circuit into the second alternating current, and output the second alternating current through the alternating current terminal of the PFC circuit. The absolute value of the instantaneous voltage value of the first component is less than or equal to the preset threshold.

In actual use, the alternating current terminal of the PFC circuit 401 may be a three-phase alternating current terminal, and is configured to receive a three-phase alternating current. Alternatively, the alternating current terminal of the PFC circuit 401 may be a single-phase alternating current terminal, and is configured to receive a single-phase alternating current.

The following describes two cases of the alternating current terminal of the PFC circuit in detail with reference to embodiments.

Embodiment 1

The alternating current terminal of the PFC circuit 401 is a three-phase alternating current terminal, and is configured to receive a three-phase alternating current. The PFC circuit 401 may include a first bidirectional converter, a second bidirectional converter, and a third bidirectional converter.

An alternating current terminal of the first bidirectional converter is a first alternating current terminal of the three-phase alternating current terminal, an alternating current terminal of the second bidirectional converter is a second alternating current terminal of the three-phase alternating current terminal, and an alternating current terminal of the third bidirectional converter is a third alternating current terminal of the three-phase alternating current terminal. The first alternating current terminal, the second alternating current terminal, and the third alternating current terminal constitute the three-phase alternating current terminal. A direct current terminal of the first bidirectional converter, a direct current terminal of the second bidirectional converter, and a direct current terminal of the third bidirectional converter constitute the direct current terminal of the PFC circuit, and the direct current terminal of the PFC circuit is connected to a first direct current bus.

A function of disposing the three bidirectional converters is as follows: When the converter 400 is configured to perform "forward charging", the first bidirectional converter may perform single-phase rectification on a phase A alternating current that is received by the first alternating current terminal and that is in the three-phase alternating current, the second bidirectional converter may perform single-phase rectification on a phase B alternating current that is received by the second alternating current terminal and that is in the three-phase alternating current, and the third bidirectional converter may perform single-phase rectification on a phase C alternating current that is received by the third alternating current terminal and that is in the three-phase alternating current. When the converter 400 is configured to perform "reverse discharging", the first bidirectional converter may perform inversion processing on a direct current received by the direct current terminal of the PFC circuit 401, to obtain the phase A alternating current in the three-phase alternating current, and output the phase A alternating current through the first alternating current terminal, the second bidirectional converter may perform inversion processing on the direct current received by the direct current terminal of the PFC circuit, to obtain the phase B alternating current in the three-phase alternating current, and output the phase B alternating current through the second alternating current terminal, and the third bidirectional converter may perform inversion processing on the direct current received by the direct current terminal of the PFC circuit, to obtain the phase C alternating current in the three-phase alternating current, and output the phase C alternating current through the third alternating current terminal, so as to output the second alternating current in a three-phase alternating current form. When the converter 400 is configured to perform "reverse discharging", the first bidirectional converter may perform inversion processing on a direct current received by the direct current terminal of the PFC circuit 401, and output an alternating current obtained after inversion processing through the first alternating current terminal, and the second alternating current terminal is connected to a neutral line, so as to output the second alternating current in a single-phase alternating current form.

One bidirectional converter constitutes one single-phase converter, and the PFC circuit 401 may implement a Y-type connection by using the three bidirectional converters.

In an exemplary implementation, the PFC circuit 401 may further include a first direct current bus connected to the first bidirectional converter, the second bidirectional converter, and the third bidirectional converter.

The following provides a specific structure of the PFC circuit 401.

Specifically, the first unidirectional converter includes: a first inductor, where a first terminal of the first inductor is connected to the first alternating current terminal; a first bidirectional switch, where the first bidirectional switch is connected between a second terminal of the first inductor and a positive terminal of the first direct current bus; and a second bidirectional switch, where the second bidirectional switch is connected between the second terminal of the first inductor and a negative terminal of the first direct current bus.

The second bidirectional converter includes: a second inductor, where a first terminal of the second inductor is connected to the second alternating current terminal; a third bidirectional switch, where the third bidirectional switch is connected between a second terminal of the second inductor and the positive terminal of the first direct current bus; and a fourth bidirectional switch, where the fourth bidirectional switch is connected between the second terminal of the second inductor and the negative terminal of the first direct current bus.

The third bidirectional converter includes: a third inductor, where a first terminal of the third inductor is connected to the third alternating current terminal; a fifth bidirectional switch, where the fifth bidirectional switch is connected between a second terminal of the third inductor and the positive terminal of the first direct current bus; and a sixth bidirectional switch, where the sixth bidirectional switch is connected between the second terminal of the third inductor and the negative terminal of the first direct current bus.

In an example, the bidirectional switch may include a single switch, or may include two power devices connected in reverse series. In other words, the bidirectional switch in this embodiment of this application includes two power devices connected in reverse series, so that a switching feature of the bidirectional switch is implemented by using an inherent anti-parallel diode in the switching transistor.

It should be understood that in the first bidirectional converter, the first inductor may be an independent inductor or may be a coupled inductor; similarly, in the second bidirectional converter, the second inductor may be an independent inductor or may be a coupled inductor; and in the third bidirectional converter, the third inductor may be an independent inductor or may be a coupled inductor.

In an exemplary implementation, the PFC circuit 401 may further include a seventh bidirectional switch and an eighth bidirectional switch. The seventh bidirectional switch is connected between the positive terminal of the first direct current bus and a first neutral line. The eighth bidirectional switch is connected between the negative terminal of the first direct current bus and the first neutral line.

In actual use, when the PFC circuit 401 is configured to perform "reverse discharging", if the alternating current terminal of the PFC circuit 401 outputs the second alternating current in the single-phase alternating current, any alternating current terminal in the three-phase alternating current terminal of the PFC circuit 401 and an intermediate node between the seventh bidirectional switch and the eighth bidirectional switch are used as two ports for outputting the single-phase alternating current.

For ease of understanding, the following provides two specific examples of the PFC circuit 401.

Figure 7:
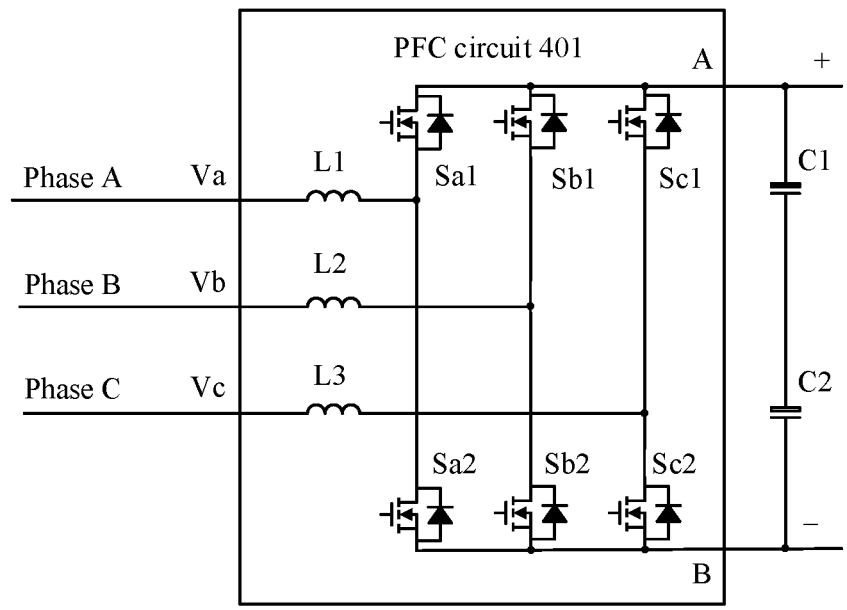
FIG. 7 is a schematic diagram of a structure of a PFC circuit according to an embodiment of this application.

FIG. 7 is a schematic diagram of a structure of a PFC circuit 401 according to an embodiment of this application. In FIG. 7, L1 may be considered as the first inductor, Sa1 may be considered as the first bidirectional switch, Sa2 may be considered as the second bidirectional switch, and L1, Sa1, and Sa2 constitute the first bidirectional converter. Similarly, L2 may be considered as the second inductor, Sb1 may be considered as the third bidirectional switch, Sb2 may be considered as the fourth bidirectional switch, and L2, Sb1, and Sb2 constitute the second bidirectional converter. L3 may be considered as the third inductor, Sc1 may be considered as the fifth bidirectional switch, Sc2 may be considered as the sixth bidirectional switch, and L3, Sc1, and Sc2 constitute the third bidirectional converter. Va may be considered as the first alternating current terminal, Vb may be considered as the second alternating current terminal, Vc may be considered as the third alternating current terminal, and Va, Vb, and Vc may receive the three-phase alternating current. A and B may be considered as two ports of the direct current terminal of the PFC circuit 401, the port A is connected to the positive terminal of the first direct current bus, and the port B is connected to the negative terminal of the first direct current bus.

A connection relationship among the devices in the PFC circuit 401 shown in FIG. 7 may be as follows: The first terminal of the inductor L1 is connected to Va, the second terminal of L1 is separately connected to a first electrode of the bidirectional switch Sa1 and a second electrode of the bidirectional switch Sa2, a second electrode of Sa1 is connected to the port A, and a first electrode of Sa2 is connected to the port B. The first terminal of the inductor L2 is connected to Vb, the second terminal of L2 is separately connected to a first electrode of the bidirectional switch Sb1 and a second electrode of the bidirectional switch Sb2, a second electrode of Sb1 is connected to the port A, and a first electrode of Sb2 is connected to the port B. The first terminal of the inductor L3 is connected to Vc, the second terminal of L3 is separately connected to a first electrode of the bidirectional switch Sc1 and a second electrode of the bidirectional switch Sc2, a second electrode of Sc1 is connected to the port A, and a first electrode of Sc2 is connected to the port B.

When three-phase rectification is implemented by using the PFC circuit 401 shown in FIG. 7, Va, Vb, and Vc are used as a three-phase alternating current input terminal, A and B are used as a direct current output terminal, and energy is transmitted from left to right. The first component of the first alternating current input on a left side is converted into the first direct current and then the first direct current is output. When three-phase inversion is implemented, A and B are used as a direct current input terminal, and are configured to receive a direct current output by a direct current bus. Va, Vb, and Vc are used as an alternating current output terminal, and energy is transmitted from right to left. The second direct current input on a right side is converted into the second alternating current and then the second alternating current is output through Va, Vb, and Vc. When single-phase inversion is implemented, A and B are used as a direct current input terminal, and are configured to receive a direct current output by a direct current bus. Va and Vb are used as a single-phase alternating current output terminal, and energy is transmitted from right to left. The second direct current input on a right side is converted into the second alternating current and then the second alternating current is output through Va and Vb.

Figure 8:
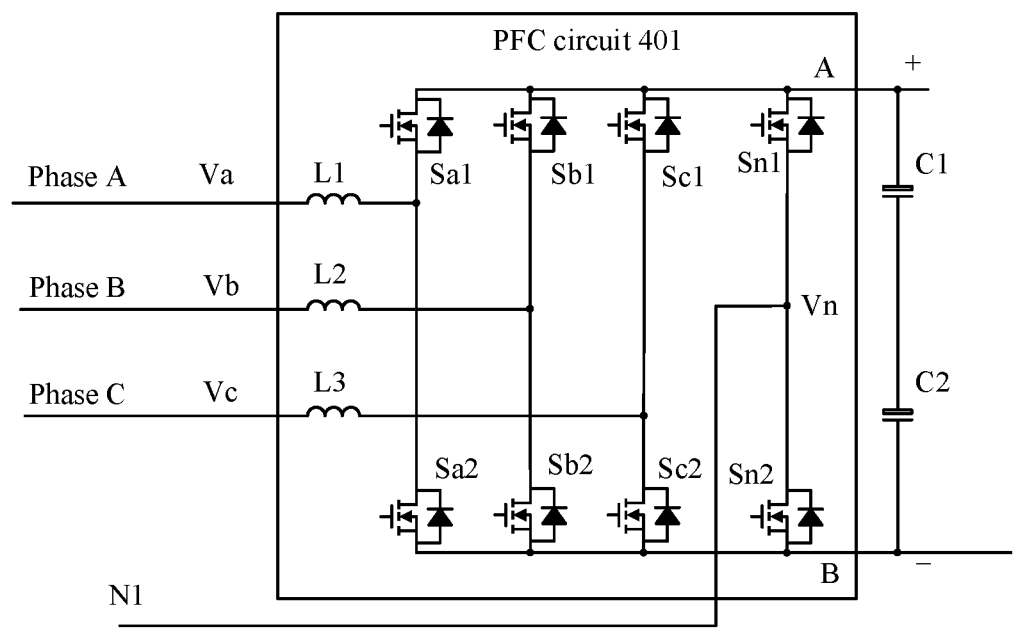
FIG. 8 is a schematic diagram of a structure of a PFC circuit according to an embodiment of this application.

FIG. 8 is a schematic diagram of a structure of another PFC circuit 401 according to an embodiment of this application. In FIG. 8, L1, Sa1, and Sa2 constitute the first bidirectional converter; L2, Sb1, and Sb2 constitute the second bidirectional converter; and L3, Sc1, and Sc2 constitute the third bidirectional converter. Sn1 may be considered as the seventh bidirectional switch, Sn2 may be considered as the eighth bidirectional switch, Va may be considered as the first alternating current terminal, Vb may be considered as the second alternating current terminal, and Vc may be considered as the third alternating current terminal. Va, Vb, and Vc may receive the three-phase alternating current. A and B may be considered as two ports of the direct current terminal of the PFC circuit 401, the port A is connected to the positive terminal of the first direct current bus, the port B is connected to the negative terminal of the first direct current bus, and Vn is connected to a neutral line N1.

When three-phase rectification is implemented by using the PFC circuit 401 shown in FIG. 8, Va, Vb, and Vc are used as a three-phase alternating current input terminal, A and B are used as a direct current output terminal, and energy is transmitted from left to right. The first component of the first alternating current input on a left side is converted into the first direct current and then the first direct current is output. When three-phase inversion is implemented, A and B are used as a direct current input terminal, and are configured to receive a direct current output by a direct current bus. Va, Vb, and Vc are used as an alternating current output terminal, and energy is transmitted from right to left. The second direct current input on a right side is converted into the second alternating current and then the second alternating current is output through Va, Vb, and Vc. When single-phase inversion is implemented, A and B are used as a direct current input terminal, and are configured to receive a direct current output by a direct current bus. Va and Vn are used as an alternating current output terminal, and energy is transmitted from right to left. The second direct current input on a right side is converted into the second alternating current and then the second alternating current is output through Va and Vn.

Embodiment 2

The alternating current terminal of the PFC circuit is a single-phase alternating current terminal, and is configured to receive a single-phase alternating current. The PFC circuit 401 includes a fourth bidirectional converter and a fifth bidirectional converter.

An alternating current terminal of the fourth bidirectional converter is a fourth alternating current terminal of the single-phase alternating current terminal, and an alternating current terminal of the fifth bidirectional converter is a fifth alternating current terminal of the single-phase alternating current terminal. The fourth alternating current terminal and the fifth alternating current terminal constitute the single-phase alternating current terminal. A direct current terminal of the fourth bidirectional converter and a direct current terminal of the fifth bidirectional converter constitute the direct current terminal of the PFC circuit, and the direct current terminal of the PFC circuit 401 is connected to a second direct current bus.

A function of disposing the two bidirectional converters is as follows: When the converter 400 is configured to perform "forward charging", the fourth alternating current terminal and the fifth alternating current terminal receive the single-phase alternating current, the fourth bidirectional converter may convert a positive half-cycle voltage of the received single-phase alternating current, and similarly, the fifth bidirectional converter may convert a negative half-cycle voltage of the received single-phase alternating current, to implement single-phase rectification. When the converter 400 is configured to perform "reverse discharging", the fourth bidirectional converter may perform inversion processing on a direct current received by the direct current terminal of the PFC circuit, to obtain a positive half-cycle voltage of the second alternating current, the fifth bidirectional converter may perform inversion processing on the direct current received by the direct current terminal of the PFC circuit, to obtain a negative half-cycle voltage of the second alternating current, and the second alternating current is output through the fourth alternating current terminal and the fifth alternating current terminal, to implement single-phase inversion. The fourth bidirectional converter and the fifth bidirectional converter complementarily operate. To be specific, when the fourth bidirectional converter converts the positive half-cycle voltage of the single-phase alternating current, the fifth bidirectional converter cannot convert the negative half-cycle voltage of the single-phase alternating current.

In an exemplary implementation, the PFC circuit 401 may further include a second direct current bus connected to the fourth bidirectional converter and the fifth bidirectional converter.

The following provides a specific structure of the PFC circuit 401.

The fourth unidirectional converter includes: a fourth inductor, where a first terminal of the fourth inductor is connected to the fourth alternating current terminal; a ninth bidirectional switch, where the ninth bidirectional switch is connected between a second terminal of the fourth inductor and a positive terminal of the second direct current bus; and a tenth bidirectional switch, where the tenth bidirectional switch is connected between the second terminal of the fourth inductor and a negative terminal of the second direct current bus.

The fifth bidirectional converter includes: a fifth inductor, where a first terminal of the fifth inductor is connected to the fifth alternating current terminal; an eleventh bidirectional switch, where the eleventh bidirectional switch is connected between a second terminal of the fifth inductor and the positive terminal of the second direct current bus; and a twelfth bidirectional switch, where the twelfth bidirectional switch is connected between the second terminal of the fifth inductor and the negative terminal of the second direct current bus.

It should be understood that in the fourth bidirectional converter, the fourth inductor may be an independent inductor or may be a coupled inductor; and similarly, in the fifth bidirectional converter, the fifth inductor may be an independent inductor or may be a coupled inductor.

In an exemplary implementation, the PFC circuit 401 may further include a thirteenth bidirectional switch and a fourteenth bidirectional switch.

The thirteenth bidirectional switch is connected between the positive terminal of the second direct current bus and a second neutral line. The fourteenth bidirectional switch is connected between the negative terminal of the second direct current bus and the second neutral line.

In actual use, when the PFC circuit 401 is configured to perform "reverse discharging", if the alternating current terminal of the PFC circuit 401 outputs a single-phase alternating current, any alternating current terminal of the single-phase alternating current terminal of the PFC circuit 401 and an intermediate node between the thirteenth bidirectional switch and the fourteenth bidirectional switch are used as two ports for outputting the single-phase alternating current.

For ease of understanding, the following provides two specific examples of the PFC circuit.

Figure 9:
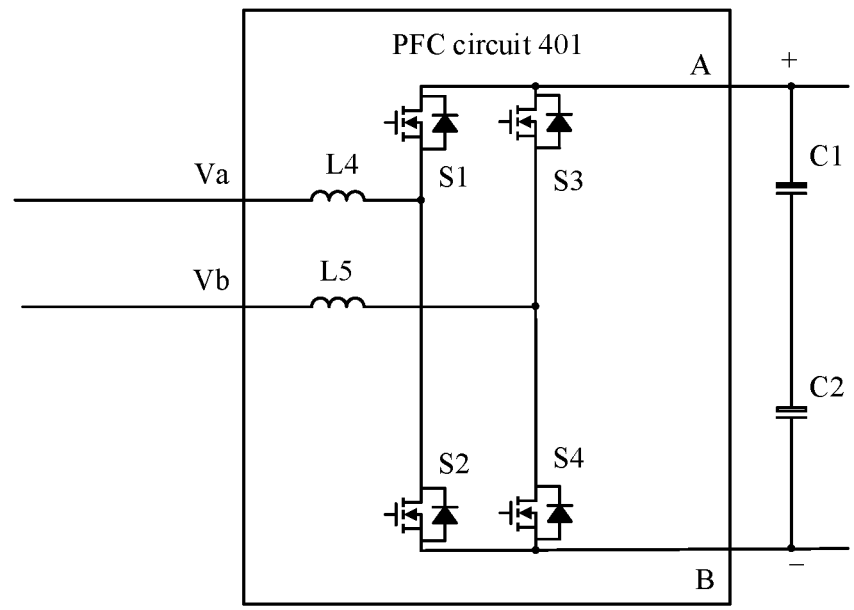
FIG. 9 is a schematic diagram of a structure of a PFC circuit according to an embodiment of this application.

FIG. 9 is a schematic diagram of a structure of a PFC circuit 401 according to an embodiment of this application. In FIG. 9, L4 may be considered as the fourth inductor, S1 may be considered as the ninth bidirectional switch, S2 may be considered as the tenth bidirectional switch, and L4, S1, and S2 constitute the fourth bidirectional converter. Similarly, L5 may be considered as the fifth inductor, S3 may be considered as the eleventh bidirectional switch, S4 may be considered as the twelfth bidirectional switch, and L5, S3, and S4 constitute the fifth bidirectional converter. Va may be considered as the fourth alternating current terminal, Vb may be considered as the fifth alternating current terminal, and Va and Vb may receive the single-phase alternating current. A and B may be considered as two ports of the direct current terminal of the PFC circuit 401, the port A is connected to the positive terminal of the second direct current bus, and the port B is connected to the negative terminal of the second direct current bus.

A connection relationship among the devices in the PFC circuit 401 shown in FIG. 9 may be as follows: The first terminal of the inductor L4 is connected to Va, the second terminal of L4 is separately connected to a first electrode of the bidirectional switch S1 and a second electrode of the bidirectional switch S2, a second electrode of S1 is connected to the port A, and a first electrode of S2 is connected to the port B. The first terminal of the inductor L5 is connected to Vb, the second terminal of L5 is separately connected to a first electrode of the bidirectional switch S3 and a second electrode of the bidirectional switch S4, a second electrode of S3 is connected to the port A, and a first electrode of S4 is connected to the port B.

When single-phase rectification is implemented by using the PFC circuit 401 shown in FIG. 9, Va and Vb are used as a single-phase alternating current input terminal, A and B are used as a direct current output terminal, energy is transmitted from left to right, and the first component of the first alternating current input on a left side is converted into the first direct current and then the first direct current is output. When single-phase inversion is implemented, A and B are used as a direct current input terminal, and are configured to receive a direct current output by a direct current bus. Va and Vb are used as an alternating current output terminal, and energy is transmitted from right to left. The second direct current input on a right side is converted into the second alternating current and then the second alternating current is output through Va and Vb.

Figure 10:
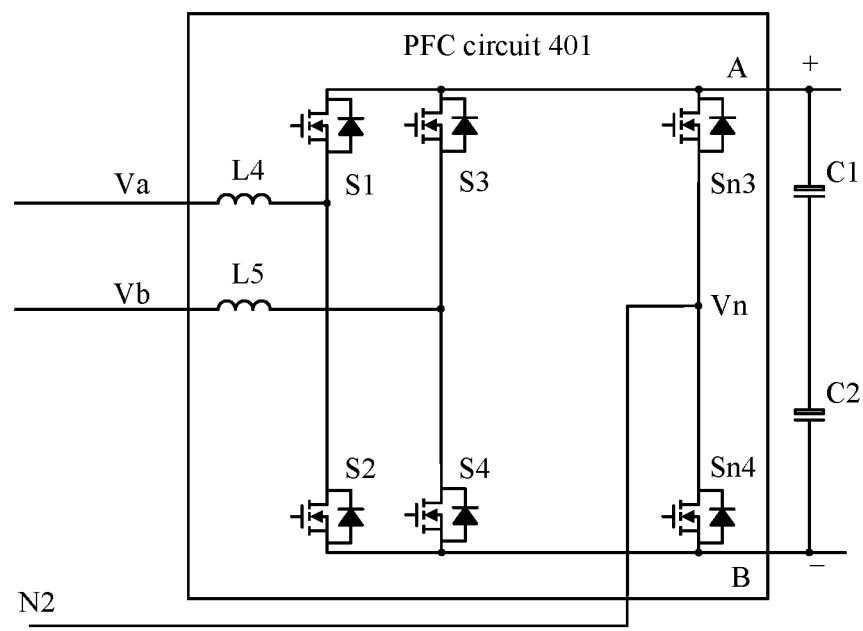
FIG. 10 is a schematic diagram of a structure of a PFC circuit according to an embodiment of this application.

FIG. 10 is a schematic diagram of a structure of another PFC circuit 401 according to an embodiment of this application. In FIG. 10, L4, S1, and S2 constitute the fourth bidirectional converter, L5, S3, and S4 constitute the fifth bidirectional converter, Sn3 may be considered as the thirteenth bidirectional switch, Sn4 may be considered as the fourteenth bidirectional switch, Va may be considered as the fourth alternating current terminal, and Vb may be considered as the fifth alternating current terminal. Va and Vb may receive the single-phase alternating current. A and B may be considered as two ports of the direct current terminal of the PFC circuit 401, the port A is connected to the positive terminal of the second direct current bus, the port B is connected to the negative terminal of the second direct current bus, and Vn may be considered as a port connected to a neutral line N2.

When single-phase rectification is implemented by using the PFC circuit 401 shown in FIG. 10, Va and Vb are used as a single-phase alternating current input terminal, A and B are used as a direct current output terminal, energy is transmitted from left to right, and the first component of the first alternating current input on a left side is converted into the first direct current and then the first direct current is output. When single-phase inversion is implemented, A and B are used as a direct current input terminal, and are configured to receive a direct current output by a direct current bus. Va and Vn are used as an alternating current output terminal, and energy is transmitted from right to left. The second direct current input on a right side is converted into the second alternating current and then the second alternating current is output through Va and Vn.

In actual use, to implement precise control on the positive half-cycle voltage and the negative half-cycle voltage, an inductance value of the fifth inductor and an inductance value of the sixth inductor may be different.

Figure 11:
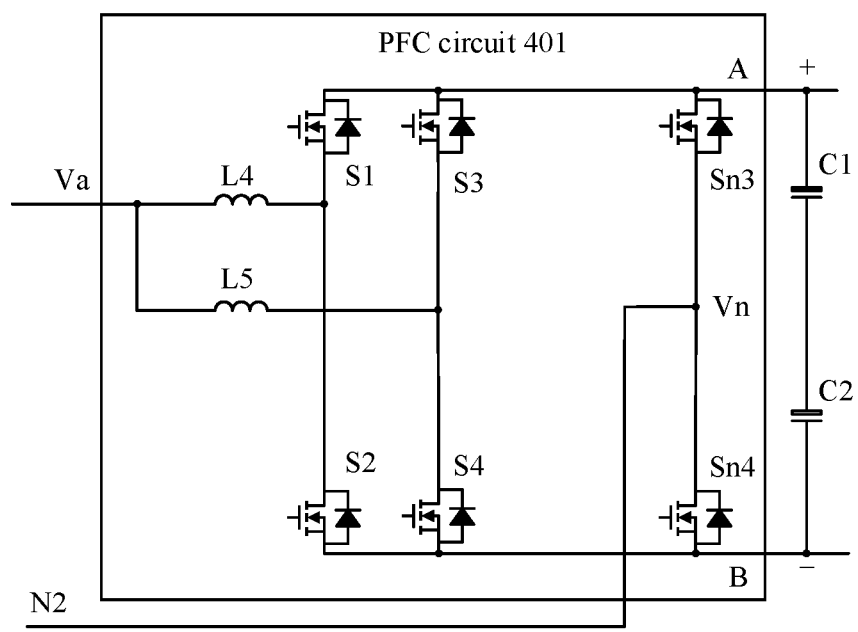
FIG. 11 is a schematic diagram of a structure of a PFC circuit according to an embodiment of this application.

In an exemplary manner, the fourth alternating current terminal may be connected to the fifth alternating current terminal. As shown in FIG. 11, when single-phase rectification is implemented by using the PFC circuit 401 shown in FIG. 11, Va and Vn are used as a single-phase alternating current input terminal, A and B are used as a direct current output terminal, energy is transmitted from left to right, and the first component of the first alternating current input on a left side is converted into the first direct current and then the first direct current is output. When single-phase inversion is implemented, A and B are used as a direct current input terminal, and are configured to receive a direct current output by a direct current bus. Va and Vn are used as an alternating current output terminal, and energy is transmitted from right to left. The second direct current input on a right side is converted into the second alternating current and then the second alternating current is output through Va and Vn.

In addition, after using the foregoing structure, the PFC circuit 401 may implement AC/DC conversion and DC/AC conversion, and may further obtain a high power factor and a low current harmonic by controlling on/off of the bidirectional switches in the PFC circuit 401.

Certainly, the foregoing description of the structure of the PFC circuit 401 is merely an example. In actual application, the PFC circuit 401 may alternatively use another structure to implement three-phase rectification and three-phase inversion.

2. Switch Circuit 403

The first terminal of the switch circuit 403 is connected to the direct current terminal of the surge protection circuit 402, the second terminal of the switch circuit 403 is connected to the direct current terminal of the PFC circuit 401, and the switch circuit 403 may be configured to be turned on when the direct current terminal of the PFC circuit outputs the first direct current, and to be turned off when the alternating current terminal of the PFC circuit outputs the second alternating current.

When the alternating current terminal that is of the surge protection circuit 403 and that is connected to the first terminal of the switch circuit 403 is a three-phase alternating current terminal, the switch circuit 403 may include a first unidirectional switch and a second unidirectional switch.

Specifically, a first electrode of the first unidirectional switch is connected to the direct current terminal of the surge protection circuit, and a second electrode of the first unidirectional switch is connected to the positive terminal of the first direct current bus; and a first electrode of the second unidirectional switch is connected to the negative terminal of the first direct current bus, and a second electrode of the second unidirectional switch is connected to the direct current terminal of the surge protection circuit. The first electrode of the first unidirectional switch is a positive electrode of the first unidirectional switch, and the second electrode of the first unidirectional switch is a negative electrode of the first unidirectional switch.

A function of disposing the first unidirectional switch and the second unidirectional switch is as follows: When the surge protection circuit 401 converts the second component of the first alternating current and outputs the third direct current, the first unidirectional switch and the second unidirectional switch are turned on, and form an electric energy transmission path for the third direct current with the first direct current bus; and when the converter is in inversion, the first unidirectional switch and the second unidirectional switch are turned off, to avoid a short-circuit path between the surge protection circuit 402 and the PFC circuit 401.

When the alternating current terminal that is of the surge protection circuit 403 and that is connected to the first terminal of the switch circuit 403 is a single-phase alternating current terminal, the switch circuit 403 may include a third unidirectional switch and a fourth unidirectional switch.

Specifically, a first electrode of the third unidirectional switch is connected to the direct current terminal of the surge protection circuit, and a second electrode of the third unidirectional switch is connected to the positive terminal of the second direct current bus; and a first electrode of the fourth unidirectional switch is connected to the negative terminal of the second direct current bus, and a second electrode of the fourth unidirectional switch is connected to the direct current terminal of the surge protection circuit.

It should be noted that a function of disposing the third unidirectional switch and the fourth unidirectional switch is the same as the function of disposing the first unidirectional switch and the second unidirectional switch. Details are not described herein in this application again.

With reference to the foregoing structure of the PFC circuit 401, the following provides two specific examples of the switch circuit 403.

Figure 12:
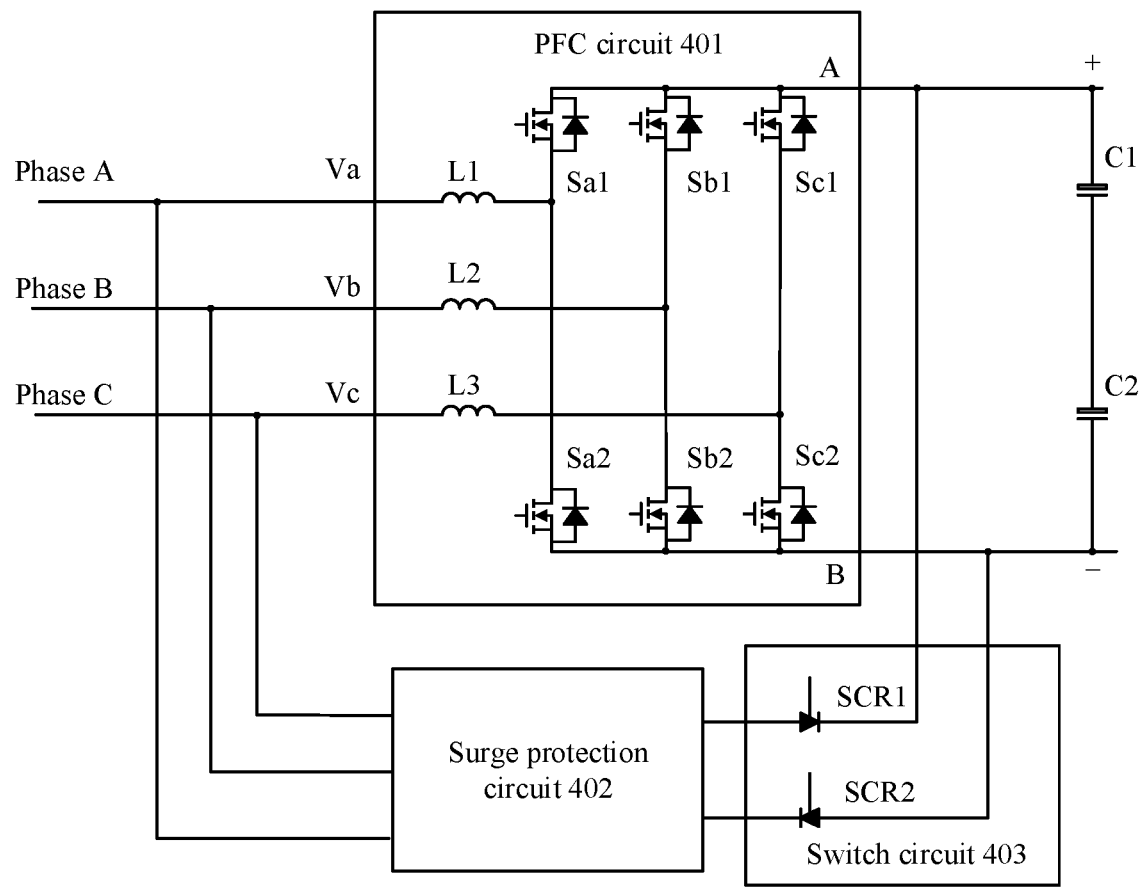
FIG. 12 is a schematic diagram of a structure of a switch circuit according to an embodiment of this application.

FIG. 12 is a schematic diagram of a structure of a switch circuit 403 according to an embodiment of this application.

In FIG. 12, SCR1 may be considered as the first unidirectional switch, and SCR2 may be considered as the second unidirectional switch.

By using the foregoing structure of the switch circuit 403, when the surge protection circuit 402 implements three-phase rectification, the controller sends a control signal to SCR1 and SCR2, where the control signal is used to control SCR1 and SCR2 to be turned on. In this case, the surge protection circuit 402 transmits the third direct current output by the direct current terminal to the first direct current bus through a closed path constituted by SCR1, SCR2, and the first direct current bus, and energy is transmitted from left to right. When the PFC circuit 401 implements three-phase or single-phase inversion, there is no control signal sent to SCR1 and SCR2. In this case, if the direct current terminal of the surge protection circuit 402 outputs electric energy, the electric energy cannot pass through the PFC circuit. This effectively avoids a short-circuit path between the surge protection circuit 402 and the PFC circuit 401, thereby avoiding a short-circuit failure of the converter 400.

Figure 13:
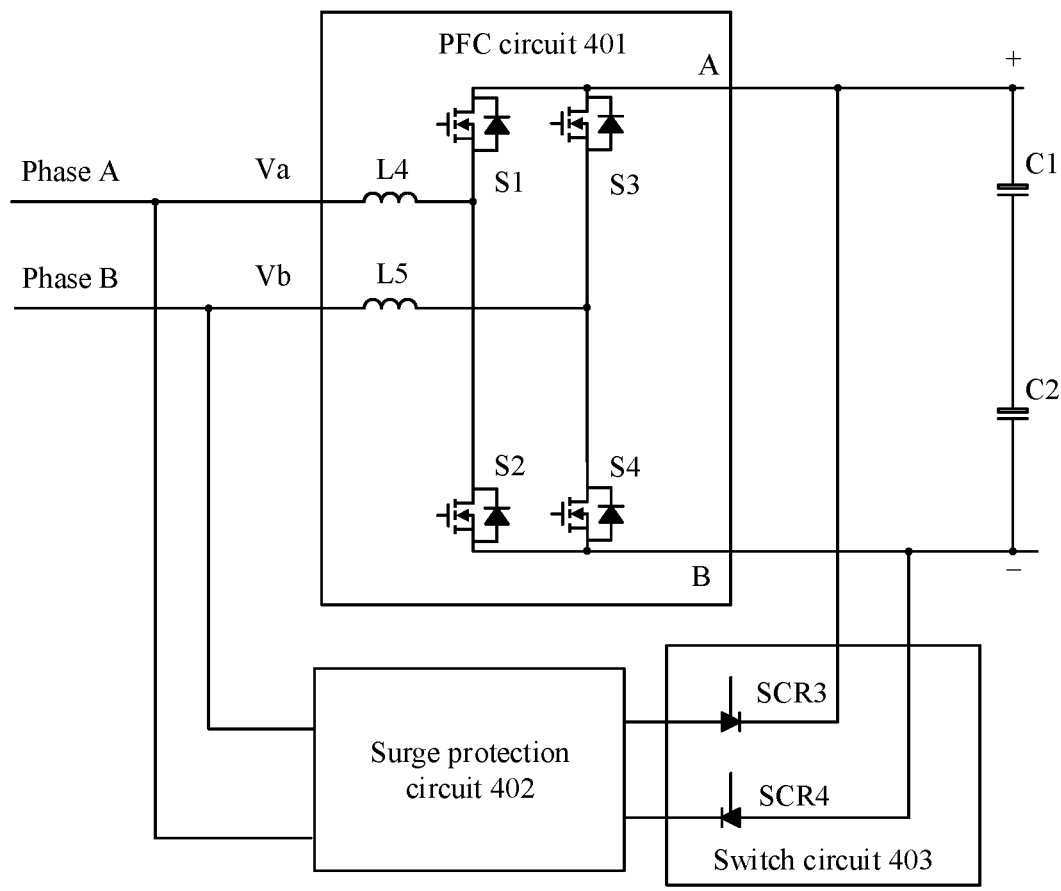
FIG. 13 is a schematic diagram of a structure of a switch circuit according to an embodiment of this application.

FIG. 13 is a schematic diagram of a structure of another switch circuit 403 according to an embodiment of this application. In FIG. 13, SCR3 may be considered as the third unidirectional switch, and SCR4 may be considered as the fourth unidirectional switch.

By using the foregoing structure of the switch circuit 403, when the surge protection circuit implements three-phase rectification, the controller sends a control signal to SCR3 and SCR4, where the control signal is used to control SCR3 and SCR4 to be turned on. In this case, the surge protection circuit 402 transmits the third direct current output by the direct current terminal to the second direct current bus through a closed path constituted by SCR3, SCR4, and the second direct current bus, and energy is transmitted from left to right. When the PFC circuit 401 implements three-phase or single-phase inversion, there is no control signal sent to SCR3 and SCR4. In this case, if the direct current terminal of the surge protection circuit 402 outputs electric energy, the electric energy cannot pass through the PFC circuit. This effectively avoids a short-circuit path between the surge protection circuit 402 and the PFC circuit 401, thereby avoiding a short-circuit failure of the converter 400.

It should be noted that the unidirectional switch in this embodiment of this application may be a silicon controlled rectifier (SCR). When a control electrode of the SCR receives the control signal, a first electrode of the SCR transmits a current to a second electrode. When the SCR does not receive the control signal, the SCR is turned off, and the first electrode of the SCR cannot transmit a current to the second electrode.

Certainly, the foregoing description of the structure of the switch circuit 403 is merely an example. In actual application, the switch circuit 403 may use another structure. For example, a bidirectional switch may be used to replace a unidirectional switch, and an electric energy transmission time and an electric energy transmission direction of the switch circuit 401 are controlled by controlling a control signal of the bidirectional switch.

3. Surge Protection Circuit 402

The alternating current terminal of the surge protection circuit 402 is connected to the alternating current terminal of the PFC circuit 401, the direct current terminal of the surge protection circuit 402 is connected to the first terminal of the switch circuit 403, and the surge protection circuit 402 may be configured to: convert the second component of the first alternating current into the third direct current, and output the third direct current through the direct current terminal of the surge protection circuit. The absolute value of the instantaneous voltage value of the second component is greater than the preset threshold.

The alternating current terminal of the surge protection circuit 402 may be a three-phase alternating current terminal, and is configured to convert the second component of the first alternating current received by the three-phase alternating current terminal, to obtain the third direct current. Alternatively, the alternating current terminal of the surge protection circuit 402 may be a single-phase alternating current terminal, and is configured to convert the second component of the first alternating current received by the single-phase alternating current terminal, to obtain the third direct current.

If the alternating current terminal of the surge protection circuit 402 is a three-phase alternating current terminal, the surge protection circuit 402 may include a first unidirectional converter, a second unidirectional converter, and a third unidirectional converter.

An alternating current terminal of the first unidirectional converter is connected to the first alternating current terminal, an alternating current terminal of the second unidirectional converter is connected to the second alternating current terminal, and an alternating current terminal of the third unidirectional converter is connected to the third alternating current terminal. The alternating current terminal of the first unidirectional converter, the alternating current terminal of the second unidirectional converter, and the alternating current terminal of the third unidirectional converter constitute the alternating current terminal of the surge protection circuit 402, and a direct current terminal of the first unidirectional converter, a direct current terminal of the second unidirectional converter, and a direct current terminal of the third unidirectional converter constitute the direct current terminal of the surge protection circuit 402.

A function of disposing the three unidirectional converters is as follows: When a surge voltage (the second component) exists in the first alternating current received by the three-phase alternating current terminal of the surge protection circuit 402, the first unidirectional converter may perform single-phase rectification on a phase A alternating current that is received by the first alternating current terminal and that is in the three-phase alternating current, the second unidirectional converter may perform single-phase rectification on a phase B alternating current that is received by the second alternating current terminal and that is in the three-phase alternating current, and the third unidirectional converter may perform single-phase rectification on a phase C alternating current that is received by the third alternating current terminal and that is in the three-phase alternating current.

In actual use, because the direct current terminal of the surge protection circuit 402 is connected to the direct current terminal of the PFC circuit 401 through the switch circuit 403, and the switch circuit 401 is turned off when the PFC circuit performs inversion, the surge protection circuit 402 can implement only AD/DC conversion, and cannot implement DC/AC conversion.

The following provides a specific structure of the surge protection circuit.

The first unidirectional converter may include a first diode, a second diode, a third diode, a fourth diode, a fifth diode, and a sixth diode.

Specifically, the first diode is connected between the first alternating current terminal and the first electrode of the first unidirectional switch; the second diode is connected between the first alternating current terminal and the second electrode of the second unidirectional switch; the third diode is connected between the second alternating current terminal and the first electrode of the first unidirectional switch; the fourth diode is connected between the second alternating current terminal and the second electrode of the second unidirectional switch; the fifth diode is connected between the third alternating current terminal and the first electrode of the first unidirectional switch; and the sixth diode is connected between the third alternating current terminal and the second electrode of the second unidirectional switch.

For ease of understanding, the following provides a specific example of the surge protection circuit.

Figure 14:
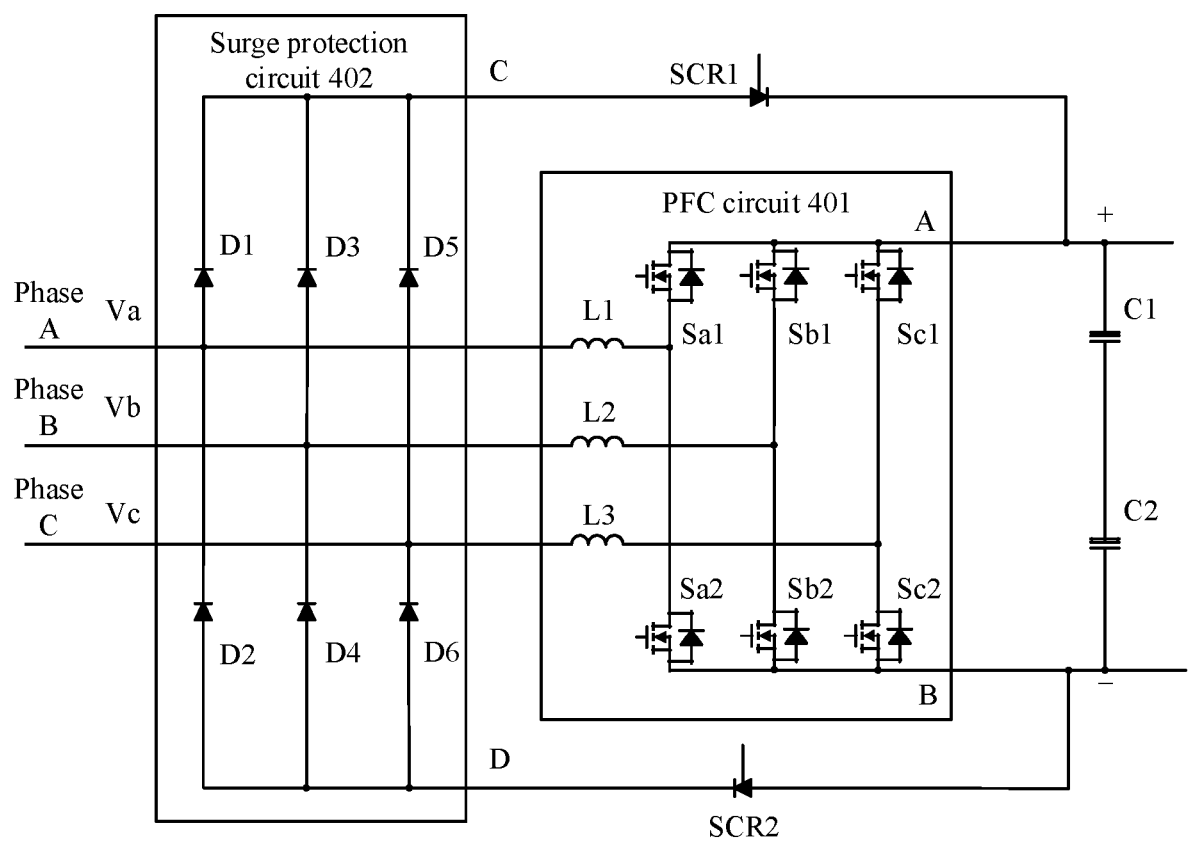
FIG. 14 is a schematic diagram of a structure of a surge protection circuit according to an embodiment of this application.

FIG. 14 is a schematic diagram of a structure of a surge protection circuit 402 according to an embodiment of this application. In FIG. 14, D1 may be considered as the first diode, D2 may be considered as the second diode, and D1 and D2 constitute the first unidirectional converter. Similarly, D3 may be considered as the third diode, D4 may be considered as the fourth diode, and D3 and D4 constitute the second unidirectional converter. D5 may be considered as the fifth diode, D6 may be considered as the sixth diode, and D5 and D6 constitute the third unidirectional converter. Va may be considered as the first alternating current terminal, Vb may be considered as the second alternating current terminal, and Vc may be considered as the third alternating current terminal. C and D may be considered as two ports of the direct current terminal of the surge protection circuit 402. The port C is connected to the positive terminal of the first direct current bus, and the port D is connected to the negative terminal of the first direct current bus.

When three-phase rectification is implemented by using the surge protection circuit 402 shown in FIG. 14, Va, Vb, and Vc are used as a three-phase alternating current input terminal, C and D are used as a direct current output terminal, and energy is transmitted from left to right. The second component of the first alternating current input on a left side is converted into the third direct current and then the third direct current is output through the ports C and D.

If the alternating current terminal of the surge protection circuit 402 is a single-phase alternating current terminal, the surge protection circuit 402 may include an H-bridge rectifier circuit including diodes.

An intermediate node of a first bridge arm of the H-bridge rectifier circuit is connected to the fourth alternating current terminal, an intermediate node of a second bridge arm of the H-bridge rectifier circuit is connected to the fifth alternating current terminal, both a first terminal of the first bridge arm and a first terminal of the second bridge arm are connected to the first electrode of the third unidirectional switch, and both a second terminal of the first bridge arm and a second terminal of the second bridge arm are connected to the second electrode of the fourth unidirectional switch.

A function of disposing the H-bridge rectifier circuit is as follows: When a surge voltage (the second component) exists in the first alternating current received by the single-phase alternating current terminal of the surge protection circuit 402, the first bridge arm of the H-bridge rectifier circuit may convert a positive half-cycle voltage of the second component, and the second bridge arm of the H-bridge rectifier circuit may convert a negative half-cycle voltage of the second component, to implement single-phase rectification of the single-phase alternating current received by the single-phase alternating current terminal.

In actual use, because the direct current terminal of the surge protection circuit 402 is connected to the direct current terminal of the PFC circuit 401 through the switch circuit 403, and the switch circuit 401 is turned off when the PFC circuit performs inversion, the surge protection circuit 402 can implement only AD/DC conversion, and cannot implement DC/AC conversion.

To facilitate connection, the following provides a specific example of the surge protection circuit.

Figure 15:
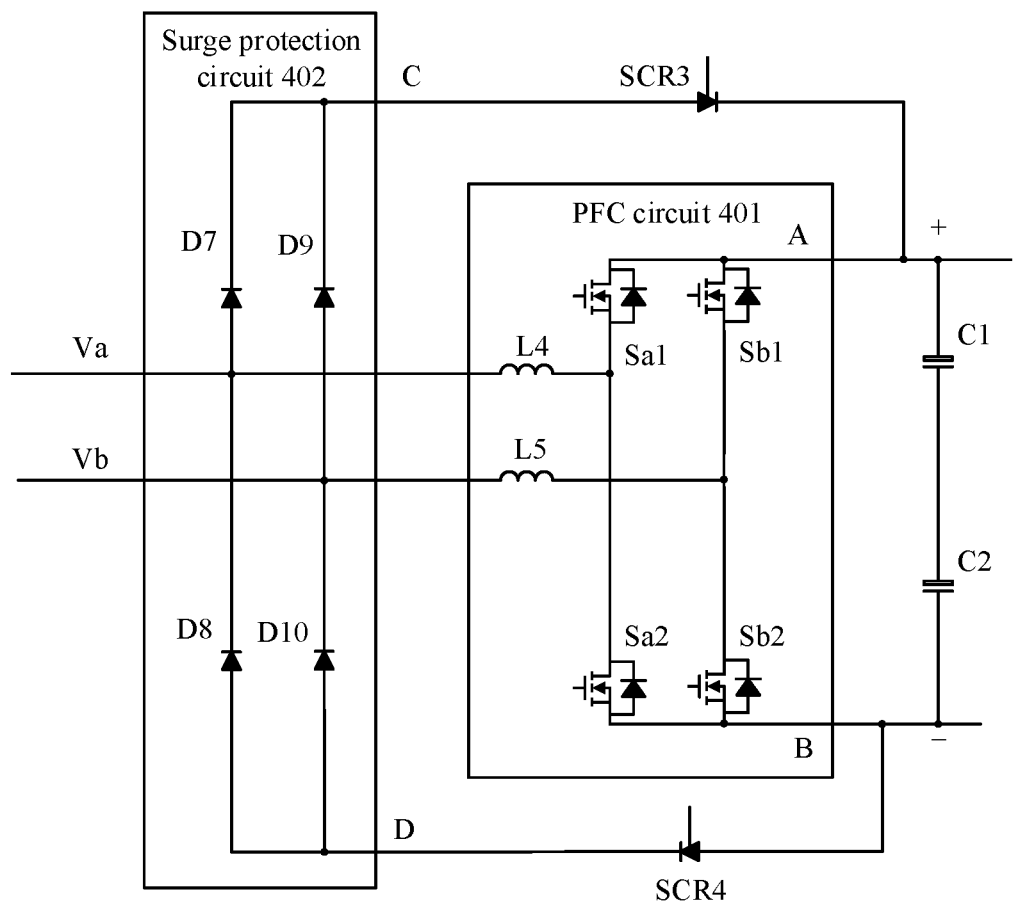
FIG. 15 is a schematic diagram of a structure of a surge protection circuit according to an embodiment of this application.

FIG. 15 is a schematic diagram of a structure of a surge protection circuit 402 according to an embodiment of this application. In FIG. 15, the surge protection circuit includes: diodes D7, D8, D9, and D10, where D7, D8, D9, and D10 constitute the H-bridge rectifier circuit. C and D may be considered as two ports of the direct current terminal of the surge protection circuit 402. The port C is connected to the positive terminal of the second direct current bus, and the port D is connected to the negative terminal of the second direct current bus.

When single-phase rectification is implemented by using the surge protection circuit 402 shown in FIG. 15, Va and Vb are used as a single-phase alternating current input terminal, C and D are used as a direct current output terminal, and energy is transmitted from left to right. The second component of the first alternating current input on a left side is converted into the third direct current and then the third direct current is output through the ports C and D.

Certainly, the foregoing description of the structure of the surge protection circuit 402 is merely an example. In actual application, the surge protection circuit 402 may alternatively use another structure. For example, the surge protection circuit 402 may use a bidirectional switch to replace a diode, and rectification is implemented by controlling a control signal of the bidirectional switch.

Figure 16:
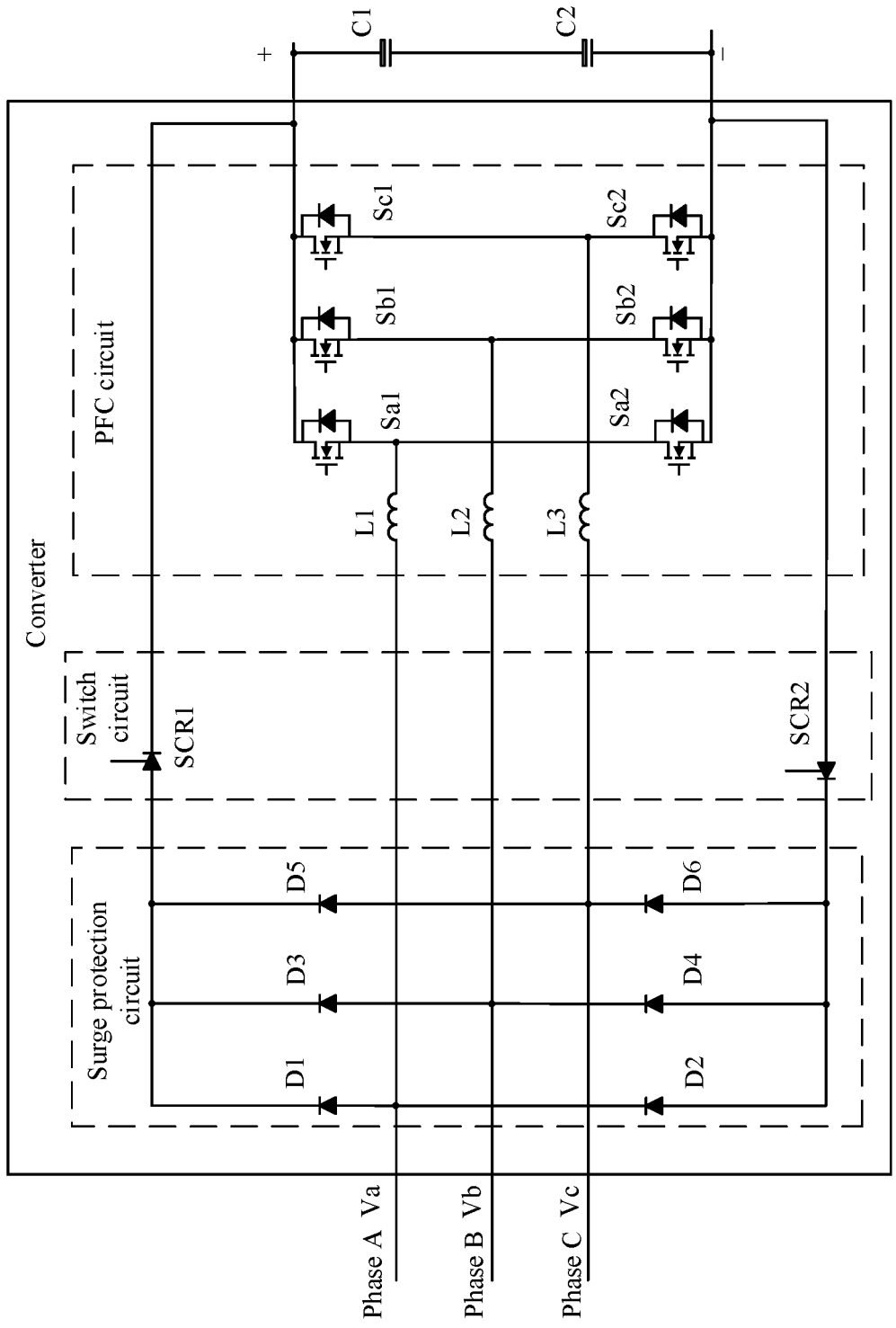
FIG. 16 is a schematic diagram of a structure of a converter according to an embodiment of this application.

With reference to the foregoing description, for example, a converter provided in the embodiments of this application may be shown in FIG. 16.

A PFC circuit includes inductors L1, L2, and L3, and bidirectional switches Sa1, Sa2, Sb1, Sb2, Sc1, and Sc2. L1, Sa1, and Sa2 constitute a first bidirectional converter; L2, Sb1, and Sb2 constitute a second bidirectional converter; and L3, Sc1, and Sc2 constitute a third bidirectional converter. Input phase lines on an alternating current side are respectively connected to the inductors L1, L2 and L3. Second electrodes of the bidirectional switches Sa1, Sb1, and Sc1 are connected to a positive terminal of a first direct current bus, and second electrodes of the bidirectional switches Sa2, Sb2, and Sc2 are connected to a negative terminal of the first direct current bus. A first electrode of Sa1 is separately connected to the second electrode of Sb1 and a second terminal of the inductor L1, a first electrode of Sb1 is separately connected to the second electrode of Sb2 and a second terminal of the inductor L2, and a first electrode of Sc1 is separately connected to the second electrode of Sc2 and a second terminal of the inductor L3. The bidirectional switches are all connected to an external control circuit (or a controller), and the control circuit implements a corresponding function of the PFC circuit by controlling on/off of a switching transistor.

A surge protection circuit includes diodes D1, D2, D3, D4, D5, and D6. The diodes D1 and D2 constitute a first unidirectional converter, D3 and D4 constitute a second unidirectional converter, and D5 and D6 constitute a third unidirectional converter. Cathodes of D1, D3, and D5 are connected to a switch circuit, and anodes of D2, D4, and D6 are connected to the switch circuit. An anode of D1 is separately connected to a cathode of D2 and a port Va, an anode of D3 is separately connected to a cathode of D4 and Vb, and an anode of D5 is separately connected to a cathode of D6 and Vc.

The switch circuit includes unidirectional switches SCR1 and SCR2. A first electrode of SCR1 is connected to the cathodes of D1, D3, and D5, a second electrode of SCR1 is connected to a positive terminal of a direct current bus, a first electrode of SCR2 is connected to a negative terminal of the direct current bus, and a second electrode of SCR2 is connected to the anodes of D2, D4, and D6.

When the converter shown in FIG. 14 implements three-phase rectification, a part of circuit uses diode rectification (the surge protection circuit), and a part of circuit uses bidirectional switch rectification (the PFC circuit). When inversion is implemented, a circuit (the PFC circuit) including bidirectional switches is used to perform inversion.

When the converter shown in FIG. 16 is configured to perform three-phase rectification, Va, Vb, and Vc are used as a three-phase input terminal of the converter, and two terminals connected to the first direct current bus are used as a direct current output terminal of the converter. If a surge voltage (a second component) exists in a first alternating current received by the three-phase alternating current terminal, the PFC circuit converts a first component of the first alternating current into a first direct current, and the surge protection circuit converts the second component of the first alternating current into a third direct current, so that the third direct current is output through the direct current output terminal of the converter. When there is no surge voltage exists in the first alternating current received by the three-phase alternating current terminal, the PFC circuit converts the first alternating current into the first direct current.

When the converter shown in FIG. 16 is configured to perform three-phase inversion or single-phase inversion, SCR1 and SCR2 are turned off, the bidirectional switches Sa1, Sa2, Sb1, Sb2, Sc1, and Sc2 are complementarily turned on, and energy is transmitted from right to left. In this case, two terminals connected to the first direct current bus are used as a direct current input terminal of the converter, and Va, Vb, and Vc are used as a three-phase alternating current output terminal of the converter (or Va and Vb are used as a single-phase alternating current output terminal of the converter).

Because the switch circuit does not operate during single-phase inversion or three-phase inversion, a closed path of the alternating current output terminal cannot be formed between the surge protection circuit and the PFC circuit. Therefore, a short-circuit failure cannot occur in the converter shown in FIG. 16.

Figure 17:
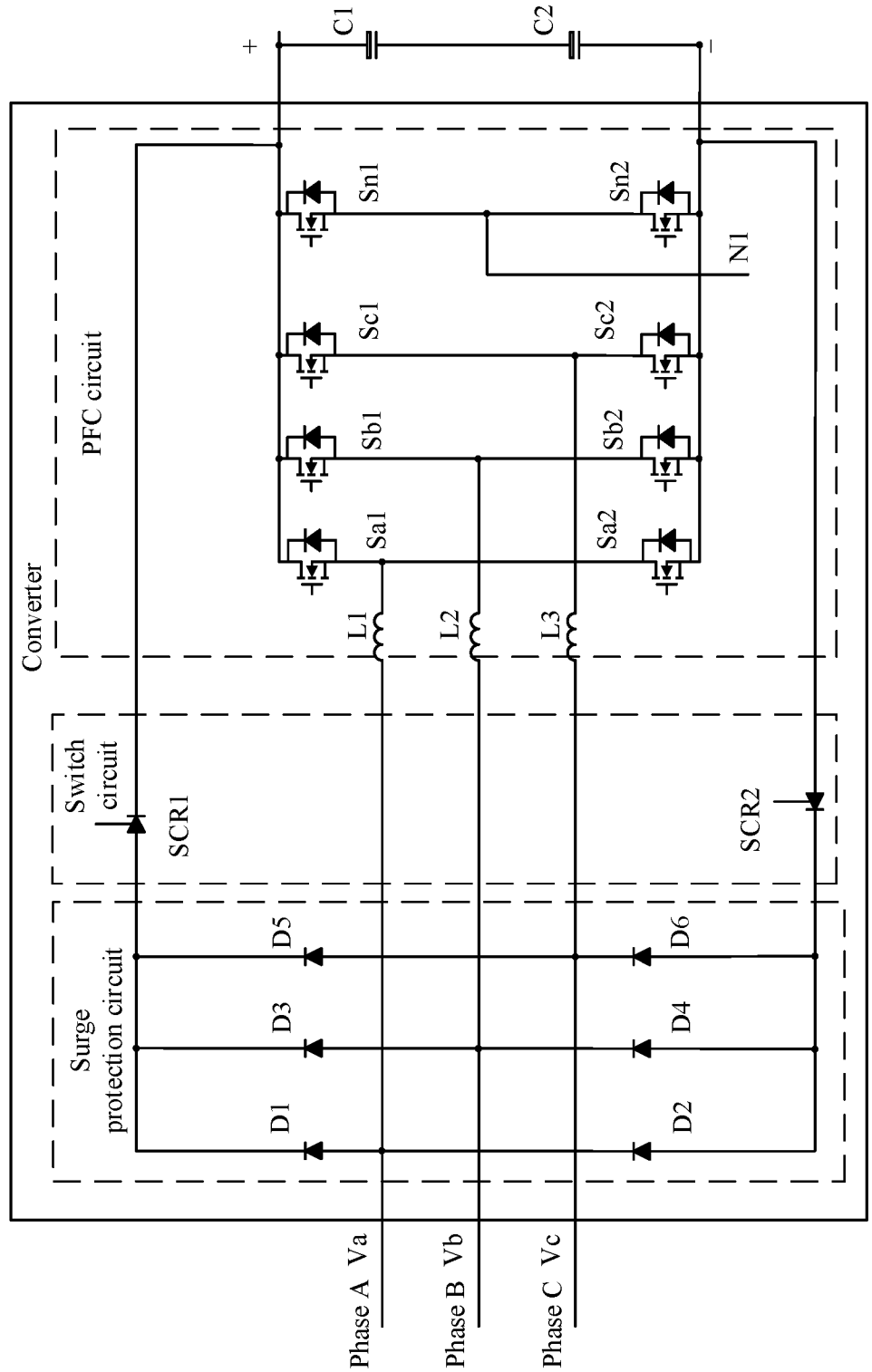
FIG. 17 is a schematic diagram of a structure of a converter according to an embodiment of this application.

Certainly, the foregoing description of the structure of the converter is merely an example. In actual application, as shown in FIG. 17, the PFC circuit may alternatively include a port and a bidirectional switch that are connected to a neutral line.

Figure 18:
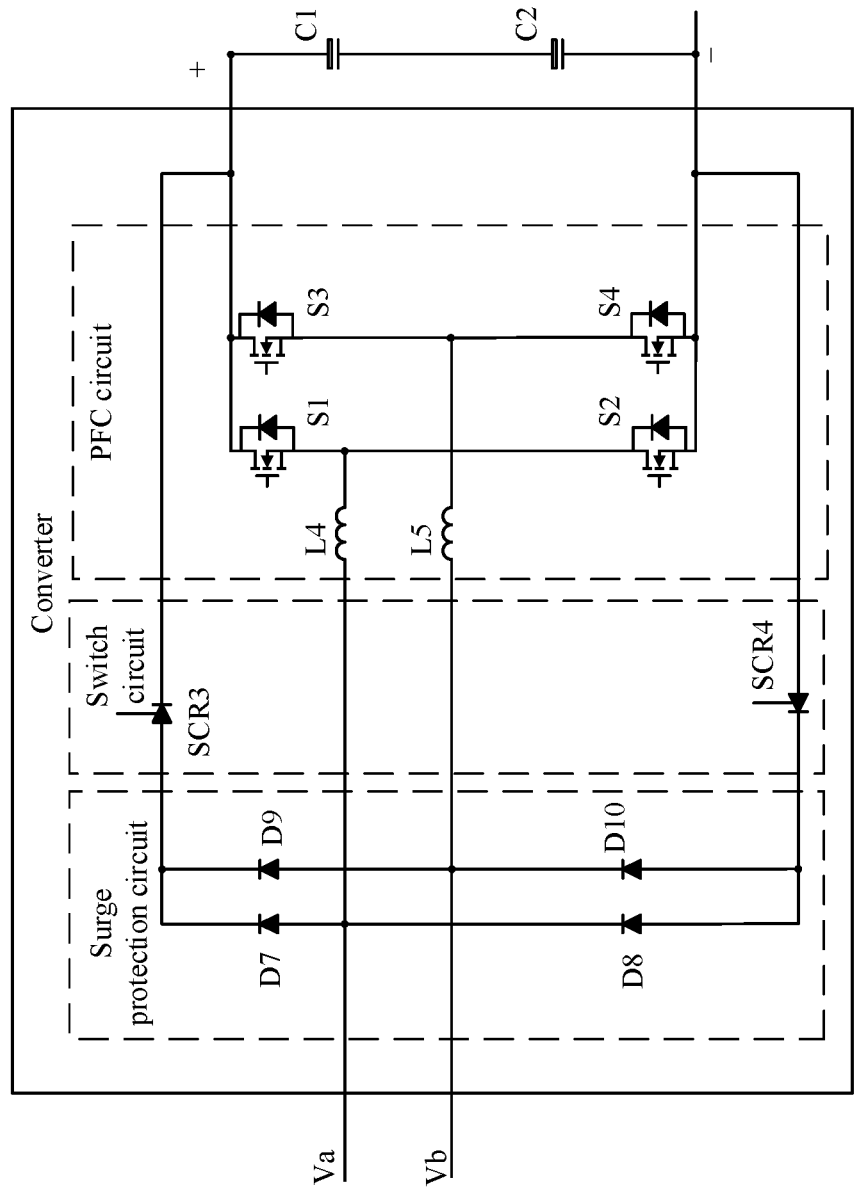
FIG. 18 is a schematic diagram of a structure of a converter according to an embodiment of this application.

With reference to the foregoing description, for example, another converter provided in the embodiments of this application may be shown in FIG. 18.

A PFC circuit includes inductors L4 and L5 and bidirectional switches S1, S2, S3, and S4. L4, S1, and S2 constitute a fourth bidirectional converter, and L5, S3, and S4 constitute a fifth bidirectional converter. Input phase lines on an alternating current side are respectively connected to the inductors L4 and L5. Second electrodes of the bidirectional switches S1 and S3 are connected to a positive terminal of a second direct current bus, and second electrodes of the bidirectional switches S2 and S4 are connected to a negative terminal of the second direct current bus. A first electrode of S1 is separately connected to the second electrode of S2 and a second terminal of the inductor L4. A first electrode of S3 is separately connected to the second electrode of S4 and a second terminal of the inductor L5. The bidirectional switches are all connected to an external control circuit (or a controller), and the control circuit implements a corresponding function of the PFC circuit by controlling on/off of a switching transistor.

A surge protection circuit includes an H-bridge rectifier circuit including diodes D7, D8, D9, and D10. Cathodes of D7 and D9 are connected to a switch circuit, anodes of D8 and D10 are connected to the switch circuit, the cathode of D7 is separately connected to the anode of D8 and a port Va, and the cathode of D9 and the anode of D8 are connected to a port Vb.

The switch circuit includes unidirectional switches SCR3 and SCR4. A first electrode of SCR3 is separately connected to the cathodes of D7 and D9, a second electrode of SCR3 is connected to a positive terminal of a direct current bus, a first electrode of SCR4 is connected to a negative terminal of the direct current bus, and a second electrode of SCR4 is separately connected to the anodes of D8 and D10.

When the converter shown in FIG. 18 implements single-phase rectification, a part of circuit uses diode rectification (the surge protection circuit), and a part of circuit uses bidirectional switch rectification (the PFC circuit). When inversion is implemented, a circuit (the PFC circuit) including bidirectional switches is used to perform inversion.

When the converter shown in FIG. 18 is configured to perform single-phase rectification, Va and Vb are used as an alternating current input terminal of the converter, and two terminals connected to the direct current bus are used as a direct current output terminal of the converter. If a surge voltage (a second component) exists in a first alternating current received by the single-phase alternating current terminal, the PFC circuit converts a first component of the first alternating current into a first direct current, and the surge protection circuit converts the second component of the first alternating current into a third direct current, so that the third direct current is output through the direct current output terminal of the converter. When there is no surge voltage exists in the first alternating current received by the single-phase alternating current terminal, the PFC circuit converts the first alternating current into the first direct current.

When the converter shown in FIG. 18 is configured to perform single-phase inversion, SCR3 and SCR4 are turned off, the bidirectional switches S1, S2, S3, and S4 are complementarily turned on, and energy is transmitted from right to left. In this case, two terminals connected to the direct current bus are used as a direct current input terminal of the converter, and Va and Vb are used as a single-phase alternating current output terminal of the converter.

Because the switch circuit does not operate during single-phase inversion, a closed path of the alternating current output terminal cannot be formed between the surge protection circuit and the PFC circuit. Therefore, a short-circuit failure cannot occur in the converter shown in FIG. 18.

Figure 19:
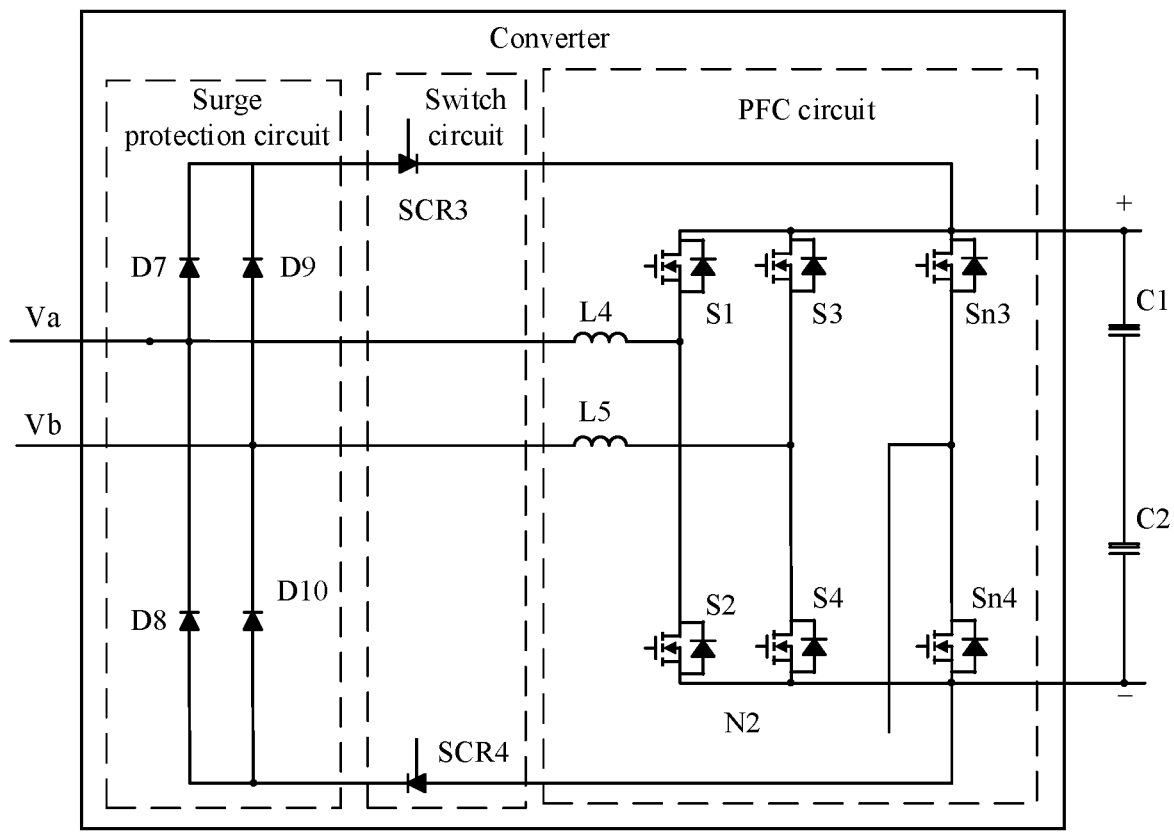
FIG. 19 is a schematic diagram of a structure of a converter according to an embodiment of this application.

Certainly, the foregoing description of the structure of the converter is merely an example. In actual application, as shown in FIG. 19, the PFC circuit may alternatively include a port and a bidirectional switch that are connected to a neutral line.

Figure 20:
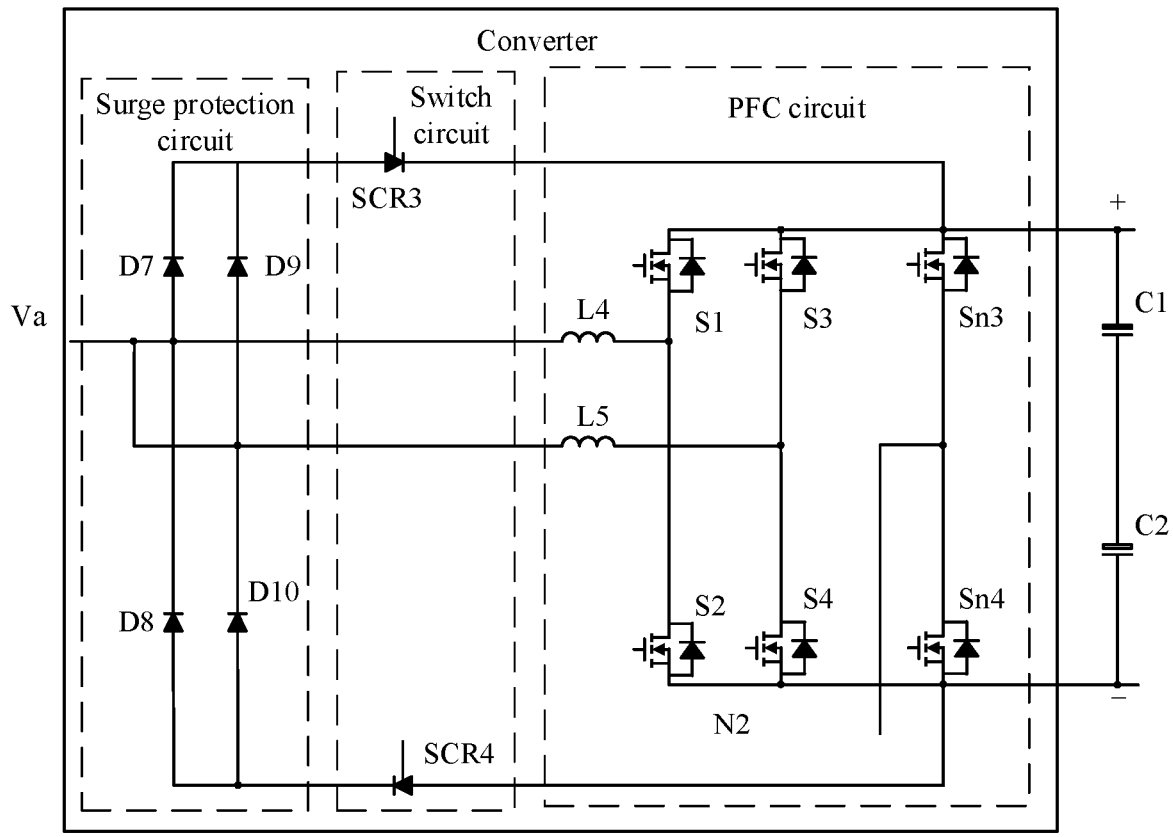
FIG. 20 is a schematic diagram of a structure of a converter according to an embodiment of this application.

In implementation, a fourth alternating current terminal and a fifth alternating current terminal that are configured to receive a single-phase alternating current may be connected, as shown in FIG. 20. In this case, the fourth alternating current terminal and the port connected to the neutral line receive the single-phase alternating current.

Figure 21:
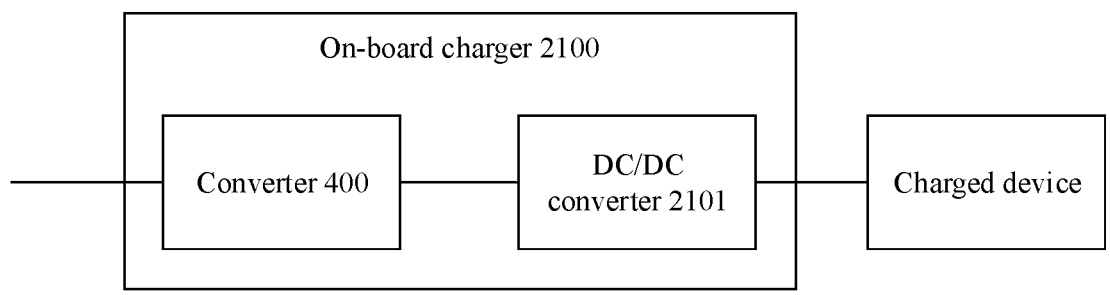
FIG. 21 is a schematic diagram of a structure of an on-board charger according to an embodiment of this application.

Based on a same inventive concept, an embodiment of this application further provides an on-board charger. Refer to FIG. 21. The on-board charger 2100 includes the foregoing converter 400 and/or a DC/DC converter circuit 2101.

The converter 400 is configured to: receive a first alternating current, convert the first alternating current into a first direct current, and output the first direct current to the DC/DC converter circuit 2101; and convert a second direct current output by the DC/DC converter circuit 2101 into a second alternating current, and output the second alternating current. The DC/DC converter circuit 2101 is connected to the converter 400. The DC/DC converter circuit 2101 is configured to: convert the first direct current output by the converter 400 into a third direct current, and output the third direct current to a charged device; and convert a fourth direct current output by the charged device into a second direct current, and transmit the second direct current to the converter 400.

Specifically, the charged device may be a power battery. For example, the charged device may be a power battery such as a nickel metal hydride battery, a lithium battery, or a lead-acid battery. When discharging, the charged device may charge a load such as an induction cooker, a rice cooker, a mobile phone, or another terminal.

Optionally, the on-board charger 2100 may further include an alternating current power supply. The alternating current power supply is configured to supply power to the converter 400 and the DC/DC converter circuit 2101, that is, the alternating current power supply may output the first alternating current.

Optionally, the on-board charger 2100 further includes a charged device, and the DC/DC converter circuit 2101 is configured to charge the charged device.

Optionally, the on-board charger 2100 further includes a power consumption device, and the converter 400 may be configured to supply power to the power consumption device.

It should be understood that solutions provided in this application may be applied to charging and discharging solutions of different vehicles. Specifically, the vehicles include but are not limited to different types of vehicles such as a pure/battery electric vehicle (Pure EV/Battery EV), a hybrid electric vehicle (HEV), and a new energy vehicle. In addition, the apparatus provided in this application is not limited to being applied to the field of vehicles, but may be further applied to the fields such as wind power generation and photovoltaic power generation.

The foregoing description describes exemplary implementations of this application, but is not intended to limit the protection scope of this application. Any variation or replacement readily figured out by a person skilled in the art within the technical scope disclosed in this application may fall within the protection scope of this application.

What is claimed is:

1. A converter, comprising:
    a power factor correction (PFC) circuit comprising two direct current terminals and two or more alternating current terminals;
    a surge protection circuit comprising three unidirectional converters or two bridge arms, wherein each of the three unidirectional converters or each of the two bridge arms comprises two diodes, wherein an anode of a first diode of each of the three unidirectional converters or each of the two bridge arms is connected to a respective alternating current terminal of the surge protection circuit, and wherein a cathode of a second diode of each of the three unidirectional converters or each of the two bridge arms is connected to a respective alternating current terminal of the surge protection circuit;

a switch circuit comprising a first unidirectional switch and a second unidirectional switch, wherein a first end of the first unidirectional switch is connected to a cathode of the first diode of each of the three unidirectional converters or each of the two bridge arms, wherein a first end of the second unidirectional switch is connected to an anode of the second diode of each of the three unidirectional converters or each of the two bridge arms, and wherein a second end of the first unidirectional switch and a second end of the second unidirectional switch are connected to the two direct current terminals of the PFC circuit; and a controller configured to:
turn on both the first and second unidirectional switches to control the PFC circuit to perform AC/DC conversion by receiving alternating current from the two or more alternating current terminals of the PFC circuit and outputting direct current from the two direct current terminals of the PFC circuit; and turn off both the first and second unidirectional switches to control the PFC circuit to perform DC/AC conversion by receiving direct current from the two direct current terminals of the PFC circuit and outputting alternating current from the two or more alternating current terminals of the PFC circuit.

2. The converter according to claim 1, wherein the two or more alternating current terminals of the PFC circuit form a three-phase alternating current terminal, and the PFC circuit comprises a first bidirectional converter, a second bidirectional converter, and a third bidirectional converter;

wherein an alternating current terminal of the first bidirectional converter is a first alternating current terminal of the three-phase alternating current terminal, an alternating current terminal of the second bidirectional converter is a second alternating current terminal of the three-phase alternating current terminal, an alternating current terminal of the third bidirectional converter is a third alternating current terminal of the three-phase alternating current terminal, and the first alternating current terminal, the second alternating current terminal, and the third alternating current terminal constitute the three-phase alternating current terminal; and wherein a direct current terminal of the first bidirectional converter, a direct current terminal of the second bidirectional converter, and a direct current terminal of the third bidirectional converter constitute direct current terminals of the PFC circuit, and the direct current terminals of the PFC circuit are connected to a first direct current bus.

3. The converter according to claim 2, wherein the first bidirectional converter comprises:
a first inductor, wherein a first terminal of the first inductor is connected to the first alternating current terminal;
a first bidirectional switch, wherein the first bidirectional switch is connected between a second terminal of the first inductor and a positive terminal of the first direct current bus; and
a second bidirectional switch, wherein the second bidirectional switch is connected between the second terminal of the first inductor and a negative terminal of the first direct current bus;
wherein the second bidirectional converter comprises:

a second inductor, wherein a first terminal of the second inductor is connected to the second alternating current terminal;
a third bidirectional switch, wherein the third bidirectional switch is connected between a second terminal of the second inductor and the positive terminal of the first direct current bus; and
a fourth bidirectional switch, wherein the fourth bidirectional switch is connected between the second terminal of the second inductor and the negative terminal of the first direct current bus; and
wherein the third bidirectional converter comprises:
a third inductor, wherein a first terminal of the third inductor is connected to the third alternating current terminal;
a fifth bidirectional switch, wherein the fifth bidirectional switch is connected between a second terminal of the third inductor and the positive terminal of the first direct current bus; and
a sixth bidirectional switch, wherein the sixth bidirectional switch is connected between the second terminal of the third inductor and the negative terminal of the first direct current bus.

4. The converter according to claim 3, wherein the PFC circuit further comprises:
a seventh bidirectional switch, wherein the seventh bidirectional switch is connected between the positive terminal of the first direct current bus and a first neutral line; and
an eighth bidirectional switch, wherein the eighth bidirectional switch is connected between the negative terminal of the first direct current bus and the first neutral line.

5. The converter according to claim 2, wherein the surge protection circuit comprises the three unidirectional converters, wherein the three unidirectional converters comprise a first unidirectional converter, a second unidirectional converter, and a third unidirectional converter;

wherein an alternating current terminal of the first unidirectional converter is connected to the first alternating current terminal of the PFC circuit, an alternating current terminal of the second unidirectional converter is connected to the second alternating current terminal of the PFC circuit, and an alternating current terminal of the third unidirectional converter is connected to the third alternating current terminal of the PFC circuit; and wherein the alternating current terminal of the first unidirectional converter, the alternating current terminal of the second unidirectional converter, and the alternating current terminal of the third unidirectional converter constitute alternating current terminals of the surge protection circuit, and a direct current terminal of the first unidirectional converter, a direct current terminal of the second unidirectional converter, and a direct current terminal of the third unidirectional converter constitute direct current terminals of the surge protection circuit.

6. The converter according to claim 5, wherein the first diode of the first unidirectional converter is connected between the first alternating current terminal of the surge protection circuit and the first end of the first unidirectional switch;

wherein the second diode of the first unidirectional converter is connected between the first alternating current terminal of the surge protection circuit and the second end of the second unidirectional switch;

wherein the first diode of the second unidirectional converter is connected between the second alternating current terminal of the surge protection circuit and the first end of the first unidirectional switch; and wherein the second diode of the second unidirectional converter is connected between the second alternating current terminal of the surge protection circuit and the second end of the second unidirectional switch; and wherein the first diode of the third unidirectional converter is connected between the third alternating current terminal of the surge protection circuit and the first end of the first unidirectional switch; and wherein the second diode of the third unidirectional converter is connected between the third alternating current terminal of the surge protection circuit and the second end of the second unidirectional switch.

7. The converter according to claim 1, wherein the two or more alternating current terminals of the PFC circuit form a single-phase alternating current terminal, and the PFC circuit comprises a fourth bidirectional converter and a fifth bidirectional converter;

wherein an alternating current terminal of the fourth bidirectional converter is a fourth alternating current terminal of the single-phase alternating current terminal, an alternating current terminal of the fifth bidirectional converter is a fifth alternating current terminal of the single-phase alternating current terminal, and the fourth alternating current terminal and the fifth alternating current terminal constitute the single-phase alternating current terminal; and wherein a direct current terminal of the fourth bidirectional converter and a direct current terminal of the fifth bidirectional converter constitute direct current terminals of the PFC circuit, and the direct current terminals of the PFC circuit are connected to a second direct current bus.

8. The converter according to claim 7, wherein the fourth bidirectional converter comprises:

a fourth inductor, wherein a first terminal of the fourth inductor is connected to the fourth alternating current terminal;

a ninth bidirectional switch, wherein the ninth bidirectional switch is connected between a second terminal of the fourth inductor and a positive terminal of the second direct current bus; and a tenth bidirectional switch, wherein the tenth bidirectional switch is connected between the second terminal of the fourth inductor and a negative terminal of the second direct current bus; and wherein the fifth bidirectional converter comprises:

a fifth inductor, wherein a first terminal of the fifth inductor is connected to the fifth alternating current terminal;

an eleventh bidirectional switch, wherein the eleventh bidirectional switch is connected between a second terminal of the fifth inductor and the positive terminal of the second direct current bus; and a twelfth bidirectional switch, wherein the twelfth bidirectional switch is connected between the second terminal of the fifth inductor and the negative terminal of the second direct current bus.

9. The converter according to claim 7, wherein the fourth alternating current terminal is connected to the fifth alternating current terminal, and the PFC circuit further comprises a thirteenth bidirectional switch and a fourteenth bidirectional switch;

wherein the thirteenth bidirectional switch is connected between a positive terminal of the second direct current bus and a second neutral line; and wherein the fourteenth bidirectional switch is connected between a negative terminal of the second direct current bus and the second neutral line.

10. The converter according to claim 7, wherein the surge protection circuit comprises an H-bridge rectifier circuit comprising diodes; and wherein an intermediate node of a first bridge arm of the H-bridge rectifier circuit is connected to the fourth alternating current terminal, and an intermediate node of a second bridge arm of the H-bridge rectifier circuit is connected to the fifth alternating current terminal.

11. An on-board charger, comprising:

a direct current-to-direct current (DC/DC) converter circuit; and a converter, wherein the converter comprises:

a power factor correction (PFC) circuit comprising two direct current terminals and two or more alternating current terminals;

a surge protection circuit comprising three unidirectional converters or two bridge arms, wherein each of the three unidirectional converters or each of the two bridge arms comprises two diodes, wherein an anode of a first diode of each of the three unidirectional converters or each of the two bridge arms is connected to a respective alternating current terminal of the surge protection circuit, and wherein a cathode of a second diode of each of the three unidirectional converters or each of the two bridge arms is connected to a respective alternating current terminal of the surge protection circuit;

a switch circuit comprising a first unidirectional switch and a second unidirectional switch, wherein a first end of the first unidirectional switch is connected to a cathode of the first diode of each of the three unidirectional converters or each of the two bridge arms, wherein a first end of the second unidirectional switch is connected to an anode of the second diode of each of the three unidirectional converters or the two bridge arms, and wherein a second end of the first unidirectional switch and a second end of the second unidirectional switch are connected to the two direct current terminals of the PFC circuit; and a controller configured to: turn on both the first and second unidirectional switches to control the PFC circuit to perform AC/DC conversion by receiving alternating current from the two or more alternating current terminals of the PFC circuit and outputting direct current from the two direct current terminals of the PFC circuit; and turn off both the first and second unidirectional switches to control the PFC circuit to perform DC/AC conversion by receiving direct current from the two direct current terminals of the PFC circuit and outputting alternating current from the two or more alternating current terminals of the PFC circuit;

wherein the DC/DC converter circuit is connected to the converter, and the DC/DC converter circuit is configured to:

convert a first direct current output by the converter into a third direct current, and output the third direct current to a charged device; and convert a fourth direct current output by the charged device into a second direct current, and transmit the second direct current to the converter.

12. The on-board charger according to claim 11, wherein the two or more alternating current terminals of the PFC circuit form a three-phase alternating current terminal, and the PFC circuit comprises a first bidirectional converter, a second bidirectional converter, and a third bidirectional converter;

wherein an alternating current terminal of the first bidirectional converter is a first alternating current terminal of the three-phase alternating current terminal, an alternating current terminal of the second bidirectional converter is a second alternating current terminal of the three-phase alternating current terminal, an alternating current terminal of the third bidirectional converter is a third alternating current terminal of the three-phase alternating current terminal, and the first alternating current terminal, the second alternating current terminal, and the third alternating current terminal constitute the three-phase alternating current terminal; and wherein a direct current terminal of the first bidirectional converter, a direct current terminal of the second bidirectional converter, and a direct current terminal of the third bidirectional converter constitute direct current terminals of the PFC circuit, and the direct current terminal of the PFC circuit is connected to a first direct current bus.

13. The on-board charger according to claim 12, wherein the first bidirectional converter comprises:

a first inductor, wherein a first terminal of the first inductor is connected to the first alternating current terminal;

a first bidirectional switch, wherein the first bidirectional switch is connected between a second terminal of the first inductor and a positive terminal of the first direct current bus; and a second bidirectional switch, wherein the second bidirectional switch is connected between the second terminal of the first inductor and a negative terminal of the first direct current bus;

wherein the second bidirectional converter comprises:

a second inductor, wherein a first terminal of the second inductor is connected to the second alternating current terminal;

a third bidirectional switch, wherein the third bidirectional switch is connected between a second terminal of the second inductor and the positive terminal of the first direct current bus; and a fourth bidirectional switch, wherein the fourth bidirectional switch is connected between the second terminal of the second inductor and the negative terminal of the first direct current bus; and wherein the third bidirectional converter comprises:

a third inductor, wherein a first terminal of the third inductor is connected to the third alternating current terminal;

a fifth bidirectional switch, wherein the fifth bidirectional switch is connected between a second terminal of the third inductor and the positive terminal of the first direct current bus; and a sixth bidirectional switch, wherein the sixth bidirectional switch is connected between the second terminal of the third inductor and the negative terminal of the first direct current bus.

14. The on-board charger according to claim 13, wherein the PFC circuit further comprises:

a seventh bidirectional switch, wherein the seventh bidirectional switch is connected between the positive terminal of the first direct current bus and a first neutral line; and an eighth bidirectional switch, wherein the eighth bidirectional switch is connected between the negative terminal of the first direct current bus and the first neutral line.

15. An on-board charger configured to convert a three-phase alternating current into a charging voltage to charge a power battery in a vehicle and supply electric energy stored in the power battery to a power consumption device, comprising:

a power factor correction (PFC) circuit comprising two direct current terminals and three alternating current terminals;

a surge protection circuit comprising three bridge arms, wherein each of the three bridge arms comprises two diodes, wherein an anode of a first diode and a cathode of a second diode of each of the three bridge arms is connected to an alternating current terminal of the surge protection circuit;

a switch circuit comprising a first unidirectional switch and a second unidirectional switch, wherein a first end of the first unidirectional switch is connected to a cathode of the first diode of each of the three bridge arms, wherein a first end of the second unidirectional switch is connected to an anode of the second diode of each of the three bridge arms, and wherein a second end of the first unidirectional switch and a second end of the second unidirectional switch are respectively connected to the two direct current terminals;

a direct current-to-direct current (DC/DC) converter circuit, configured to:

convert a direct current output by the PFC circuit into the charging voltage to charge the power battery, wherein both the first and second unidirectional switches are turned on when the PFC circuit converts the three-phase alternating current received from the three alternating current terminals and outputs the direct current from the two direct current terminals to the DC/DC converter; and adjust the voltage value of a direct current output by the power battery and send the direct current to the PFC circuit, wherein both the first and second unidirectional switches are turned off when the PFC circuit converts the direct current received from the two direct current terminals into an alternating current available to the power consumption device.

* * * * *